US012601722B2

(12) United States Patent
Lynn et al.

(10) Patent No.: US 12,601,722 B2
(45) Date of Patent: Apr. 14, 2026

(54) LIQUID CRYSTAL EMULSIONS STABILIZED BY NANOPARTICLES

(71) Applicants:Wisconsin Alumni Research Foundation, Madison, WI (US); University of Puerto Rico, San Juan, PR (US)

(72) Inventors: David Lynn, Middleton, WI (US); Claribel Acevedo-Velez, Mayaguez, PR (US); Oscar H. Piñeres-Quiñones, Mayaguez, PR (US)

(73) Assignees: Wisconsin Alumni Research Foundation, Madison, WI (US); University of Puerto Rico, San Juan, PR (US)

( * ) Notice: Subject to any disclaimer, the term of this patent is extended or adjusted under 35 U.S.C. 154(b) by 840 days.

(21) Appl. No.: 17/903,434

(22) Filed: Sep. 6, 2022

(65) Prior Publication Data

US 2023/0083183 A1 Mar. 16, 2023

Related U.S. Application Data

(60) Provisional application No. 63/241,198, filed on Sep. 7, 2021.

(51) Int. Cl.
*G01N 31/20* (2006.01)
*G01N 21/47* (2006.01)
(Continued)

(52) U.S. Cl.
CPC ............. *G01N 31/20* (2013.01); *G01N 21/47* (2013.01); *G01N 21/64* (2013.01); *B82Y 30/00* (2013.01)

(58) Field of Classification Search
CPC ........ G01N 31/20; G01N 21/47; G01N 21/64; G01N 15/075; G01N 15/1404;
(Continued)

(56) References Cited

U.S. PATENT DOCUMENTS 8,062,853 B2 11/2011 Abbott et al.
9,012,569 B2 4/2015 Abbott et al.
(Continued)

OTHER PUBLICATIONS

Han et al. Phys. Chem. Chem. Phys., vol. 19, Aug. 30, 2017, pp. 24955-24960.*
(Continued)

*Primary Examiner* — Maureen Wallenhorst
(74) *Attorney, Agent, or Firm* — Bell & Manning, LLC

(57) ABSTRACT

Devices and methods for using changes in the orientation of micrometer sized dispersed liquid crystal domains to detect or quantify analytes in a test sample, including amphiphilic analytes, are disclosed. The dispersed liquid crystal domains are defined by an interface, and one or more nanoparticles or nanoparticle-containing complexes are adsorbed to the interface. As a result of the adsorption of the nanoparticles or nanoparticle-containing complexes at the interface, the microdomains are stabilized, and resist coalescing for extended periods of time, unlike previously known devices using liquid crystal emulsions for analyte detection.
When the dispersed liquid crystal microdomains are exposed to the test sample, any changes in the orientation of the liquid crystal microdomains (such as from the bipolar to radial) are detected. Such changes in orientation signal the presence of analyte in the test sample, and the proportion of liquid crystal microdomains exhibiting the change in orientation is correlated with the quantity of analyte in the test sample. The nanoparticle used, the amphiphile used in the
(Continued)

SiO₂/CₙTAB
complex nanoparticle-containing complex, or both may be selected to optimize the sensitivity and/or selectivity of the device for a given analyte.

19 Claims, 14 Drawing Sheets

(51) Int. Cl.
  *G01N 21/64*          (2006.01)
  *B82Y 30/00*          (2011.01)
(58) Field of Classification Search
  CPC ............... G01N 15/1459; G01N 15/06; G01N
                                2015/0687; B82Y 30/00
  USPC ..... 436/72, 164, 166, 172; 422/82.05, 82.08
  See application file for complete search history.

(56)                    References Cited

U.S. PATENT DOCUMENTS

| | | | |
|---|---|---|---|
| 9,341,570 | B2 | 5/2016 | Abbott et al. |
| 2007/0042505 | A1* | 2/2007 | Israel ............... G01N 33/54373 |
| | | | 977/902 |
| 2019/0257821 | A1* | 8/2019 | Nicholas ................. G01N 33/52 |
| 2021/0041425 | A1* | 2/2021 | Swager ................... G01N 21/59 |

OTHER PUBLICATIONS

Pineres-Quinones et al. Langmuir, vol. 38, Jan. 10, 2022, pp. 957-967.*

Lin, I-Hsin, et al. "Endotoxin-induced structural transformations in liquid crystalline droplets." Science 332.6035. 2011. 1297-1300.

Brake, J. M.; Mezera, A. D.; Abbott, N. L. Effect of Surfactant Structure on the Orientation of Liquid Crystals at Aqueous—Liquid Crystal Interfaces. Langmuir. 2003. 19, 6436-6442.

Miller, D. S.; Wang, X.; Abbott, N. L. Design of Functional Materials Based on Liquid Crystalline Droplets. Chem. Mater. 2014. 26, 496-506.

Ortiz, B. J.; Boursier, M. E.; Barrett, K. L.; Manson, D. E.; Amador-Noguez, D.; Abbott, N. L.; Blackwell, H. E.; Lynn, D. M. Liquid Crystal Emulsions That Intercept and Report on Bacterial Quorum Sensing. ACS Appl. Mater. Interfaces. 2020. 12, 29056-29065.

Dan, A.; Aery, S.; Zhang, S.; Baker, D. L.; Gleeson, H. F.; Sarkar, A. Protein Microgel-Stabilized Pickering Liquid Crystal Emulsions Undergo Analyte-Triggered Configurational Transition. Langmuir. 2020. 36, 10091-10102.

Binks, B. P. Particles as Surfactants—Similarities and Differences. Curr. Opin. Colloid Interface Sci. 2002. 7, 21-41.

Binks, B. P.; Rodrigues, J. A.; Frith, W. J. Synergistic Interaction in Emulsions Stabilized by a Mixture of Silica Nanoparticles and Cationic Surfactant. Langmuir. 2007. 23, 3626-3636.

Cui, Z.-G.; Yang, L.-L.; Cui, Y.-Z.; Binks, B. Effects of Surfactant Structure on the Phase Inversion of Emulsions Stabilized by Mixtures of Silica Nanoparticles and Cationic Surfactant. Langmuir. 2010. 26, 4717-4724.

Chevalier, Y.; Bolzinger, M.-A. Emulsions Stabilized with Solid Nanoparticles: Pickering Emulsions. Colloids Surf. A Physicochem. Eng. Asp. 2013. 439, 23-34.

Zhu, Y.; Jiang, J.; Liu, K.; Cui, Z.; Binks, B. P. Switchable Pickering Emulsions Stabilized by Silica Nanoparticles Hydrophobized in situ with a Conventional Cationic Surfactant. Langmuir. 2015. 31, 3301-3307.

Wu, J.; Ma, G.-H. Recent Studies of Pickering Emulsions: Particles Make the Difference. Small. 2016. 12, 4633-4648.

Binks, B. P. Colloidal Particles at a Range of Fluid—Fluid Interfaces. Langmuir. 2017. 33, 6947-6963.

Ravera, F.; Ferrari, M.; Liggeri, L.; Loglio, G.; Santini, E.; Zanobini, A. Liquid-Liquid Interfacial Properties of Mixed Nanoparticle-Surfactant Systems. Colloids Surf. A Physicochem. Eng. Asp. 2008. 323, 99-108.

Binks, B. P.; Kirkland, M.; Rodrigues, J. A. Origin of Stabilisation of Aqueous Foams in Nanoparticle-Surfactant Mixtures. Soft Matter. 2008. 4, 2373-2382.

Kirby, S. M.; Anna, S. L.; Walker, L. M. Effect of Surfactant Tail Length and Ionic Strength on the Interfacial Properties of Nanoparticle-Surfactant Complexes. Soft Matter. 2018. 14, 112-123.

Maurya, N. K.; Mandal, A. Investigation of Synergistic Effect of Nanoparticle and Surfactant in Macro Emulsion Based Eor Application in Oil Reservoirs. Chem. Eng. Res. Des. 2018. 132, 370-384.

Wei, X.-Q.; Zhang, W.-J.; Lai, L.; Mei, P.; Wu, L.-M.; Wang, Y.-Q. Different Cationic Surfactants-Modified Silica Nanoparticles for Pickering Emulsions. J. Mol. Liq. 2019. 291, 111341.

Yekeen, N.; Padmanabhan, E.; Syed, A. H.; Sevoo, T.; Kanesen, K. Synergistic Influence of Nanoparticles and Surfactants on Interfacial Tension Reduction, Wettability Alteration and Stabilization of Oil-in-Water Emulsion. J. Pet. Sci. Eng. 2020. 186, 106779.

Briceño-Ahumada, Z.; Soltero-Martínez, J. F. A.; Castillo, R. Aqueous Foams and Emulsions Stabilized by Mixtures of Silica Nanoparticles and Surfactants: A State-of-the-Art Review. Chemical Engineering Journal Advances. 2021. 7, 100116.

Kumar, S.; Aswal, V. K.; Kohlbrecher, J. Size-Dependent Interaction of Silica Nanoparticles with Different Surfactants in Aqueous Solution. Langmuir. 2012. 28, 9288-9297.

Zhu, Y.; Fu, T.; Liu, K.; Lin, Q.; Pei, X.; Jiang, J.; Cui, Z.; Binks, B. P. Thermoresponsive Pickering Emulsions Stabilized by Silica Nanoparticles in Combination with Alkyl Polyoxyethylene Ether Nonionic Surfactant. Langmuir. 2017. 33, 5724-5733.

Zabala Rodriguez, Kevin J.; Lynn, David M.; Acevedo-Velez, Claribel. Self-assembly of chemically heterogeneous nanoparticles at aqueous-liquid crystal droplet interfaces (Poster). Department of Chemical Engineering, University of Puerto Rico-Mayagüez, P.R, Department of Chemical and Biological Engineering, University of Wisconsin-Madison, U.S. Dec. 4, 2019. pp. 1.

Zabala Rodriguez, Kevin J.; Lynn, David M.; Acevedo-Velez, Claribel. Influence of chemically functionalized gold nanoparticles on emulsions of thermotropic liquid crystals (Presentation). Department of Chemical Engineering, University of Puerto Rico-Mayagüez, P.R, Department of Chemical and Biological Engineering, University of Wisconsin-Madison, U.S. Nov. 9, 2019. pp. 1-19.

* cited by examiner $SiO_2/C_nTAB$ complex

SDS

DTAB $C_{12}E_4$

R = H or n = 3-11

Rhamnolipid

LIQUID CRYSTAL EMULSIONS STABILIZED BY NANOPARTICLES

CROSS-REFERENCE TO RELATED APPLICATIONS

The present application claims priority to U.S. provisional patent application No. 63/241,198 that was filed Sep. 7, 2021, the entire contents of which are incorporated herein by reference.

STATEMENT REGARDING FEDERALLY SPONSORED RESEARCH OR DEVELOPMENT

This invention was made with government support under DMR1827894 awarded by the National Science Foundation. The government has certain rights in the invention.

FIELD

This disclosure relates generally to methods of analyte detection using liquid crystals. In particular, the disclosure is directed to systems and methods utilizing micrometer-sized domains of liquid crystal to detect and/or quantify one or more analytes in a test sample, where the liquid crystal domains are stabilized by adsorbed nanoparticle-amphiphile complexes.

BACKGROUND

Interactions between the surface of liquid crystals (LCs) and potential analytes, such as amphiphilic species or biological agents, can generate rapid changes in the orientation and optical properties of the LCs.

Past studies have disclosed that confinement of LCs within micrometer-sized droplets dispersed in aqueous phases (e.g., LC-in-water emulsions) provides a versatile platform for the design of droplet-based LC sensors that can respond sensitively to the presence of amphiphilic analytes (e.g., surfactants, lipids) or biological analytes (e.g., proteins, bacterial toxins), based on adsorption of the analyte at the LC-water interface or self-assembly of the analyte on the LC droplets. The interaction of the analyte with the LC droplets causes a detectable change in the configuration, or "ordering transition" within the LC, thus facilitating analyte detection. Furthermore, because the analyte concentration is correlated with the proportion of droplets that undergo the detectable change in configuration, such platforms may also be used to quantify a given analyte of interest.

For Example, U.S. Pat. No. 8,062,853 to Abbott et al. discloses LC-in-water emulsions, where the LC droplets within the emulsions change their orientation from bipolar to radial upon exposure to the surfactant SDS. U.S. Pat. No. 9,012,569 to Abbott et al. discloses a method for scalable synthesis of oil emulsions with pre-determined drop sizes, and the use of such emulsions in LC-based detection applications. U.S. Pat. No. 9,341,570 to Abbott et al. discloses using changes in LC orientation within micrometer sized dispersed liquid crystal domains to detect or quantify analytes in a test sample, such as endotoxin lipopolysaccharide (LPS), at very low concentrations.

A significant problem with such LC emulsion-based detection systems is that they exhibit poor colloidal stability, because the LC droplets within the emulsions naturally aggregate over time (typically over a 3-5 hour period). This short shelf life currently limits the practical or commercial applications of using LC droplets as sensors/analyte detectors. Accordingly, there is a need in the art for improved LC-droplet based systems and methods, where the LC droplets are stable and do not aggregate over long periods of time, while maintaining or exhibiting improved sensitivity to and/or selectivity towards one or more analytes of interest.

SUMMARY

Herein is disclosed improved droplet-based LC sensors for the detection of analytes. Earlier droplet-based LC detection systems were improved upon by adsorbing nanoparticles or nanoparticle-containing complexes to the LC droplet interface. This approach stabilizes the LC droplets for up to 3 months, and the droplets that do fall out of suspension over time can be readily re-dispersed. Moreover, like the LC droplet-based sensors disclosed previously, the stabilized LC droplets within the improved detection systems undergo bipolar-to-radial transitions upon exposure to analytes that can be readily observed using polarized light (or other means known in the art). In addition, the extent of the ordering transition induced by the analyte at a given concentration depends upon the structure of the nanoparticle or nanoparticle-containing complex used, indicating the potential to tune not only the stability of the droplets, but also their sensitivity and/or selectivity for a given analyte.

In sum, these disclosed systems and methods address the instability issues inherent in LC droplet-based detection systems, while also imparting additional tunability to the LC droplets. These improvements could help overcome practical barriers to the fabrication, storage, and utilization of LC droplets as sensors, and have the potential to substantially increase the likelihood that such sensors can be successfully adopted for larger scale or commercial applications.

Accordingly, in a first aspect, the disclosure encompasses a liquid crystal-based system for detecting and/or quantifying an analyte. The system includes a plurality of dispersed liquid crystal microdomains that are confined by an interface and that have a detectable orientation, where the liquid crystal microdomains have a minor axis of between 0.5 μm and 200 μm. In addition, one or more nanoparticles or nanoparticle-containing complexes are adsorbed at the interface.

In some embodiments, the nanoparticles or nanoparticle-containing complexes are not surface-functionalized gold nanoparticles.

In some embodiments, the nanoparticle-containing complexes include a nanoparticle and an amphiphile.

In some embodiments, the liquid crystal microdomains are liquid crystal droplets. In some such embodiments, the liquid crystal droplets have a minor axis of between 1 μm and 10 μm.

In some embodiments, the liquid crystal microdomains are dispersed within water or within an aqueous solution, forming a liquid crystal-in-water emulsion.

In some embodiments, the liquid crystal microdomains do not coalesce for at least twenty-four hours. In some such embodiments, the liquid crystal microdomains do not coalesce for at least four days. In some such embodiments, the liquid crystal microdomains do not coalesce for at least one week. In some such embodiments, the liquid crystal microdomains do not coalesce for at least two weeks. In some such embodiments, the liquid crystal microdomains do not coalesce for at least four weeks.

In some embodiments, the amphiphile is electrostatically interacting with the nanoparticle surface. In some such embodiments, the amphiphile is electrostatically attached to the nanoparticle surface.

In some embodiments, the amphiphile is an anionic amphiphile, a cationic amphiphile, or a non-ionic amphiphile.

In some embodiments, in the absence of an analyte, at least one of the liquid crystal microdomains has bipolar orientation.

In some embodiments, the nanoparticle has a minor axis of between 1.0 nm and 500 nm.

In some embodiments, the nanoparticle, the amphiphile, or both are selected to optimize the sensitivity of the system for a given analyte.

In some embodiments, the nanoparticle, the amphiphile, or both are selected to optimize the selectivity of the system for a given analyte.

Some embodiments further include a detector capable of characterizing the orientation of the liquid crystal. In some such embodiments, the detector is a light-based imaging device. In some embodiments, the detector includes a flow cytometer.

Some embodiments further include a test sample in contact with the liquid crystal microdomains. In some such embodiments, the test sample includes an analyte that is capable of: (a) adsorbing to the interface to promote a change in the detectable orientation of the liquid crystal microdomains; or (b) reacting with a detection enhancing molecule adsorbed at the interface to promote a change in the detectable orientation of the liquid crystal microdomains.

In some embodiments, the analyte is an amphiphilic analyte. In some such embodiments, the amphiphilic analyte is a non-ionic amphiphile, a cationic amphiphile, or an anionic amphiphile.

In some embodiments that include an analyte, at least one of the liquid crystal microdomains has radial orientation or an orientation that is intermediate between bipolar and radial.

In some embodiments, the concentration of the analyte in the test sample is less than 1 mM. In some such embodiments, the concentration of the analyte in the test sample is less than 50 μM. In some such embodiments, the concentration of the analyte in the test sample is less than 20 μM. In some such embodiments, the concentration of the analyte in the test sample is less than 6 μM.

In some embodiments, the liquid crystal within the dispersed liquid crystal microdomains is 4'-pentyl-4-cyanobiphenyl (5CB) or a nematic liquid crystal.

In a second aspect, the disclosure encompasses a method for detecting an analyte in a test sample. The method includes the steps of: (a) contacting one or more dispersed liquid crystal microdomains confined by an interface and having a detectable orientation with a test sample, where one or more nanoparticles or nanoparticle-containing complexes are adsorbed at the interface; and (b) determining the orientation of the liquid crystal within the liquid crystal microdomains, wherein a change in the orientation of the liquid crystal within the liquid crystal microdomains after being contacted with the test sample indicates the presence of the analyte in the test sample.

In some embodiments, the nanoparticles or nanoparticle-containing complexes are not surface-functionalized gold nanoparticles.

In some embodiments, the nanoparticle-containing complexes include a nanoparticle and an amphiphile.

In some embodiments, the liquid crystal microdomains have a minor axis of between 0.5 μm and 200 μm.

In some embodiments, the liquid crystal microdomains are liquid crystal droplets. In some such embodiments, the liquid crystal droplets have a minor axis of between 1 μm and 10 μm.

In some embodiments, the liquid crystal microdomains are dispersed within water or within an aqueous solution, forming a liquid crystal-in-water emulsion.

In some embodiments, the amphiphile is electrostatically interacting with the nanoparticle surface. In some such embodiments, the amphiphile is electrostatically attached to the nanoparticle surface.

In some embodiments, the change in the orientation of the liquid crystal within the liquid crystal microdomains is a change from bipolar to radial orientation or a change from bipolar to an orientation that is intermediate between bipolar and radial.

In some embodiments, a plurality of dispersed liquid crystal microdomains are contacted with the test sample.

In some embodiments, the step of determining the orientation of the liquid crystal within the liquid crystal microdomains is performed by one or more of optical imaging, fluorescence imaging, optical imaging using polarized light, polarized light microscopy, bright field microscopy, fluorescence microscopy, light scattering measurement, flow cytometry, fluorescence flow cytometry, microelectrophoresis, dielectrophoresis, measurement of electrical capacitance, measurement of magnetic properties, measuring turbidity, detecting optical reflection, detecting transmittance of light, visual inspection, using a plate reader, using microwell plates, or using a cuvette in a detector.

In some embodiments, the test sample includes an analyte. In some such embodiments, the concentration of the analyte in the test sample is less than 1 mM. In some such embodiments, the concentration of the analyte in the test sample is less than 50 μM. In some such embodiments, the concentration of the analyte in the test sample is less than 20 μM. In some such embodiments, the concentration of the analyte in the test sample is less than 6 μM. In some such embodiments, the concentration of the analyte in the test sample is less than 2 μM.

In some embodiments, the analyte is capable of: (a) adsorbing to the interface to promote a change in the detectable orientation of the liquid crystal microdomains; or (b) reacting with a detection enhancing molecule adsorbed at the interface to promote a change in the detectable orientation of the liquid crystal microdomains.

In some embodiments, the analyte is an amphiphilic analyte. In some such embodiments, the amphiphilic analyte is a non-ionic amphiphile, a cationic amphiphile, or an anionic amphiphile.

In some embodiments, the nanoparticle, the amphiphile, or both are selected to optimize the sensitivity of the method for a given analyte.

In some embodiments, the nanoparticle, the amphiphile, or both are selected to optimize the selectivity of the method for a given analyte.

In some embodiments, the liquid crystal within the dispersed liquid crystal microdomains is 4'-pentyl-4-cyanobiphenyl (5CB) or a nematic liquid crystal.

In a third aspect, the disclosure encompasses a method for quantifying an analyte in a test sample. The method includes the steps of: (a) contacting a plurality of dispersed liquid crystal microdomains confined by an interface and having a detectable orientation with a test sample, where one or more nanoparticles or nanoparticle-containing complexes are adsorbed at the interface; and (b) determining the orientation of the liquid crystal in the liquid crystal microdomains, where the percentage of liquid crystal microdomains exhibiting a particular orientation or set of orientations is correlated with the quantity of analyte in the test sample.

In some embodiments, the nanoparticles or nanoparticle-containing complexes are not surface-functionalized gold nanoparticles.

In some embodiments, the nanoparticle-containing complexes include a nanoparticle and an amphiphile.

In some embodiments, the liquid crystal microdomains have a minor axis of between 0.5 μm and 200 μm.

In some embodiments, the liquid crystal microdomains are liquid crystal droplets. In some such embodiments, the liquid crystal droplets have a minor axis of between 1 μm and 10 μm.

In some embodiments, the liquid crystal microdomains are dispersed within water or within an aqueous solution, forming a liquid crystal-in-water emulsion.

In some embodiments, the amphiphile is electrostatically interacting with the nanoparticle surface. In some such embodiments, the amphiphile is electrostatically attached to the nanoparticle surface.

In some embodiments, the particular orientation is bipolar, radial or intermediate between bipolar and radial.

In some embodiments, the percentage of liquid crystal microdomains in the radial orientation, the orientation between bipolar and radial, or both is directly correlated with the quantity of analyte in the test sample.

In some embodiments, the quantity of analyte in the test sample is expressed as the concentration of analyte in the test sample.

In some embodiments, the step of determining the orientation of the liquid crystal in the liquid crystal microdomains is performed by one or more of optical imaging, fluorescence imaging, optical imaging using polarized light, polarized light microscopy, bright field microscopy, fluorescence microscopy, light scattering measurement, flow cytometry, fluorescence flow cytometry, microelectrophoresis, dielectrophoresis, measurement of electrical capacitance, measurement of magnetic properties, measuring turbidity, detecting optical reflection, detecting transmittance of light, visual inspection, using a plate reader, using microwell plates, or using a cuvette in a detector.

In some embodiments, the test sample includes an analyte. In some such embodiments, the analyte is capable of: (a) adsorbing to the interface to promote a change in the detectable orientation of the liquid crystal microdomains; or (b) reacting with a detection enhancing molecule adsorbed at the interface to promote a change in the detectable orientation of the liquid crystal microdomains.

In some embodiments, the analyte is an amphiphilic analyte. In some such embodiments, the amphiphilic analyte is a non-ionic amphiphile, a cationic amphiphile, or an anionic amphiphile.

In some embodiments, the nanoparticle, the amphiphile, or both are selected to optimize the sensitivity of the method for a given analyte.

In some embodiments, the nanoparticle, the amphiphile, or both are selected to optimize the selectivity of the method for a given analyte.

In some embodiments, the liquid crystal within the dispersed liquid crystal microdomains is 4'-pentyl-4-cyanobiphenyl (5CB) or a nematic liquid crystal.

In a fourth aspect, the disclosure encompasses a method of making a liquid crystal-based system for detecting an analyte in a test sample. The method includes the steps of:

(a) generating a plurality of liquid crystal microdomains confined by an interface and having a detectable orientation that are dispersed within an aqueous phase of a composition including the liquid crystal and water or an aqueous solution, where the liquid crystal microdomains have a minor axis of between about 0.5 μm and about 200 μm; and (b) adsorbing one or more nanoparticles or nanoparticle-containing complexes at the interface.

In some embodiments, the nanoparticles or nanoparticle-containing complexes are not surface-functionalized gold nanoparticles.

In some embodiments, the nanoparticle-containing complexes include a nanoparticle and an amphiphile.

In some embodiments, the liquid crystal within the dispersed liquid crystal microdomains is 4'-pentyl-4-cyanobiphenyl (5CB) or a nematic liquid crystal.

In some embodiments, the liquid crystal microdomains are liquid crystal droplets. In some such embodiments, the liquid crystal droplets have a minor axis of from about 1 μm to about 10 μm.

In some embodiments, the composition is a liquid crystal emulsion.

In some embodiments, the amphiphile is electrostatically interacting with the nanoparticle surface. In some such embodiments, the amphiphile is electrostatically attached to the nanoparticle surface.

In some embodiments, the nanoparticle, the amphiphile, or both are selected to optimize the sensitivity of the method for a given analyte.

In some embodiments, the nanoparticle, the amphiphile, or both are selected to optimize the selectivity of the method for a given analyte.

Other objects, features and advantages of the present invention will become apparent after review of the specification, claims and drawings.

BRIEF DESCRIPTION OF THE DRAWINGS

Illustrative embodiments of the disclosure will hereafter be described with reference to the accompanying drawings.

FIG. 2 shows the chemical structures of the nematic liquid crystal 5CB and the surfactants used in the example study.

DETAILED DESCRIPTION

I. In General

Figure 1A:
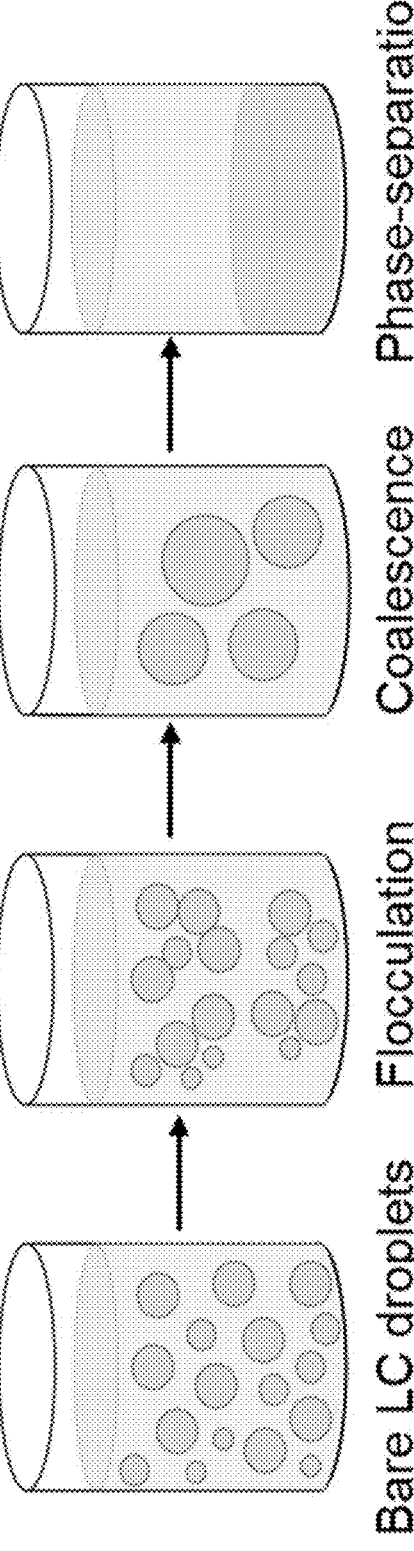
FIG. 1A is a schematic illustration of the mechanisms by which an emulsion of bare LC droplets becomes unstable.

Before the present materials and methods are described, it is understood that this disclosure is not limited to the particular methodology, protocols, materials, and reagents described, as these may vary. It is also to be understood that the terminology used herein is for the purpose of describing particular embodiments only, and is not intended to limit the scope of the invention.

As used herein and in the appended claims, the singular forms "a", "an", and "the" include the plural forms unless the context clearly dictates otherwise. As well, the terms "a" (or "an"), "one or more" and "at least one" can be used interchangeably, and the terms "comprising", "including", and "having" can be used interchangeably.

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, non-limiting specific methods and materials are now described. All publications and patents specifically mentioned herein are incorporated by reference for all purposes including describing and disclosing the chemicals, instruments, statistical analysis and methodologies which are reported in the publications which might be used in connection with the invention. All references cited in this specification are to be taken as indicative of the level of skill in the art.

As used herein, "liquid crystal" means an organic composition in an intermediate or mesomorphic state between solid and liquid. Suitable liquid crystals for use in the present invention include, but are not limited to, thermotropic, polymeric, lyotropic, chromonic, smectic, nematic, ferroelectric and cholesteric liquid crystals.

A "microdomain" of liquid crystal refers to a volume of material in the liquid crystal phase defined by an interface wherein the volume has a minor axis that is not at any point larger than 200 μm across and the minor axis is defined as the shortest length across the volume of the liquid crystal microdomain. The minor axis may be in a range of from 0.5 μm to 200 μm, from 1 μm to 100 μm, and from 1 μm to 10 μm. The major axis, defined as the largest length across the volume of the liquid crystal microdomain, may be different from the minor axis but may be within the ranges disclosed herein for the minor axis.

The terms "orientation" or "configuration" of the microdomain are used herein to describe the ordering of the liquid crystal within the microdomain, and are not used to imply the mechanism that leads to the ordering.

The following abbreviations are used throughout the present disclosure: 5CB, 4'-pentyl-4-cyanobiphenyl; $C_n$TAB, cationic trimethylammonium bromide surfactants; $C_8$TAB, trimethyloctylammonium bromide; $C_{12}$TAB, dodecyltrimethylammonium bromide; $C_{16}$TAB, hexadecyltrimethylammonium bromide; $C_{12}E_4$, tetra(ethylene glycol) monododecyl ether; LC, liquid crystal; SDS, sodium dodecyl sulfate.

II. The Invention

Two configurations of LC within microdomains are commonly seen in the disclosed systems and methods. When the LC within the microdomains anchor to the internal interface of the droplets with a tangential orientation, the configuration of the LC corresponds to a so-called "bipolar configuration." In contrast, if the LC assumes an orientation that is perpendicular to the interface, the configuration of the LC droplet changes to a "radial configuration."

It was previously known that certain analytes, including without limitation amphiphilic analytes, trigger detectable changes in orientation (such as, but not limited by, a change from bipolar to radial orientation) upon contact with liquid crystal microdomains. However, the aqueous-liquid crystal emulsions in which such microdomains are typically dispersed are prone to instability, due to droplet coalescence, surface wetting, or creaming over time. This instability limits the practical applications of using dispersed liquid crystal microdomains in sensors to detect and/or quantify analytes of interest.

In this application, it is disclosed that previously disclosed LC droplet-based detection systems can be successfully stabilized by adsorbing one or more nanoparticles or nanoparticle-containing complexes to the interface of the LC microdomains. The resulting systems resist droplet coalescence for a period of weeks or more, and can be easily reconstituted after sedimentation. Furthermore, the specific nanoparticle or complex component used can be selected to increase the sensitivity and/or selectivity of the system for a given target analyte.

The nanoparticle used in the disclosed systems and methods is not limited. In some non-limiting exemplary embodiments, the nanoparticle forms a complex with one or more amphiphiles. In some such embodiments, the surface of the nanoparticle has a makeup that facilitates non-covalent interactions with one or more amphiphiles to form the nanoparticle-amphiphile complex. In other embodiments, the nanoparticle is not a surface-functionalized gold nanoparticle.

In embodiments, the nanoparticle is spherical in shape, although "spherical" is not limited to perfectly spherical. In embodiments, the nanoparticle has a diameter in a range of from 1 nm to 500 nm. This includes a range of from 5 nm to 250 nm, from 5 nm to 150 nm, and from 10 nm to 100 nm. In embodiments, the nanoparticle is an inorganic nanoparticle, i.e., the nanoparticle comprises or consists of an inorganic material. In embodiments, the nanoparticle does not comprise a metal, e.g., gold. In embodiments, the nanoparticle comprises or consists of silica ($SiO_2$). Other materials for the nanoparticle include polymers (e.g., polystyrene), clays, and alumina. The nanoparticle may comprise or consist of any of these materials, or combinations thereof.

In some embodiments, amphiphiles may be associated with the nanoparticle through non-covalent interactions that keep the nanoparticle-amphiphile complex from dissociating. Examples of non-covalent interactions that could be used to attach the amphiphiles onto the nanoparticle surface include, without limitation, electrostatic attractions, hydrophobic interactions, dative interactions, coordination bonds, metal-mediated interactions, or other non-covalent interaction between the amphiphiles and the nanoparticle surface.

In embodiments, the amphiphile of the nanoparticle-containing complex is a surfactant. In embodiments, the surfactant is a quaternary ammonium surfactant. An illustrative quaternary ammonium surfactant is an alkyl trimethylammonium halide, e.g., an alkyl trimethylammonium bromide. The alkyl group of the trimethylammonium halide may have various numbers of carbon atoms, e.g., at least 8, 10, 12, 14, 16, 18, 20, or in a range of from 8 to 20. The alkyl group of the trimethylammonium halide may be linear or branched, but in embodiments, is linear. In embodiments, the amphiphile of the nanoparticle-containing complex, e.g., the surfactant, is charged. In such embodiments, the amphiphile may have a charge opposite that of a target analyte being contacted with the liquid crystal microdomains of the liquid crystal-based systems. In such embodiments, the amphiphile may be positively charged (e.g., as is the case with a quaternary ammonium surfactant) and the target analyte may be negatively charged. In other embodiments, the amphiphile may be positively charged and the target analyte may be uncharged. These charges may refer to charge of the amphiphile/target analyte under the operating conditions of the disclosed liquid crystal-based systems.

The relative amounts of the nanoparticle and the amphiphile of the nanoparticle-containing complex being used may vary. In embodiments, however, a sufficient amount of the nanoparticle and amphiphile is used so that the liquid crystal microdomains do not coalesce over extended periods of time, e.g., at least 30 days, 60 days, or 90 days. The absence of coalescence may be determined by measuring droplet diameters as described in the Example below obtaining results consistent with those shown in Table 1, below. Illustrative relative amounts are described in the Example, below.

Contacting a target analyte with the stabilized LC microdomains triggers detectable changes in the configuration of the LCs within the domains. The target analyte is not limited, except that it should be capable of either (a) promoting a change in the LC configuration within the microdomains, or (b) reacting with a detection-enhancing molecule adsorbed at the interface to promote a change in the LC configuration within the microdomains. Regarding "detection-enhancing molecule," this phrase refers to a chemical or biological entity that, upon reacting with the target analyte, promotes the change in the LC configuration within the microdomains. By way of illustration, LC microdomains may be decorated with a peptide or phospholipid (detection-enhancing molecule) that is cleaved by a certain enzyme (target analyte). Although neither the peptide/phospholipid nor the enzyme by themselves promote the change in the LC configuration, the cleaved peptide/phospholipid does promote the change in the LC configuration. In some embodiments, the target analyte is an amphiphilic analyte, such as an anionic amphiphile, a cationic amphiphile, or a non-ionic amphiphile. Illustrative target analytes include proteins and surfactants. In embodiments in which a nanoparticle-amphiphile complex is used, generally the target analyte is a chemical entity different from the amphiphile of the nanoparticle-amphiphile complex (although this is not necessary in every embodiment).

As used herein, a droplet of LC is a type of microdomain of LC, but the disclosed LC microdomains are not limited to droplets of LC dispersed in aqueous solutions. Instead, the disclosure encompasses composite materials containing microdomains of LC, such as polymeric and inorganic materials. The microdomains of LC may be either mobile or immobile, and the scope of this disclosure covers both immobile and mobile droplets. In addition, the shape of the domain is not limited to a spherical shape. Shapes other than spherical, including hemispherical shapes formed by droplets on surfaces, are covered within the scope of this disclosure. In embodiments, however, the droplets are spherical in shape, but "spherical" is not limited to perfectly spherical. In embodiments, the droplets have a diameter in a range of from 1 μm to 10 μm.

In a particular embodiment, the domains of LC comprise LC droplets dispersed in an aqueous phase. The configurations of the LC domains and droplets (including the changes induced by the analyte) can be determined in a low resource environment by visual inspection using polarized or bright field microscopy, or in a high throughput environment by using a continuous flow device such as a flow cytometer. A flow cytometer configured to measure light scattering (side scattering and/or forward scattering) can be used to quantify the number of liquid crystal droplets in a sample that exhibit radial and/or bipolar orientations. Measurements of electrical capacitance can also be used to determine the orientation of the liquid crystal within the microdomains.

Other methods of detection of the configurations of LCs within micrometer-sized domains and droplets are well known to those skilled in the art, including the use of fluorescent probes and dichroic dyes to report the ordering of the LC. The radial configuration of LC droplet can serve as a light wave guide, leading to fluorescent signatures of the LC droplets that permit distinction between radial and bipolar configurations. Thus, fluorescence intensity measurements and fluorescence microscopy can also be used to report the ordering of the LC in the micrometer sized domains. For example, many flow devices can report the fluorescent signature of micrometer-sized objects, including devices such as flow cytometers.

The disclosed systems and methods could be used for detecting or measuring analyte in situations where compounds that interfere with conventional assays are present. They could also be used where high levels of automation are desired, the cost of conventional assays is prohibitive, or where rapid analysis is needed. In addition to the precise makeup of the nanoparticle or nanoparticle-amphiphile complex, the volume ratio of test sample to liquid crystal emulsion (e.g., the concentration of LC droplets) can be tuned to maximize the sensitivity of the detection method.

In the example below, the liquid crystal used is 4-cyano-4'-pentylbipheny-1 (5 CB). These molecules can be assembled into a so-called nematic LC phase, where the molecules exhibit long-range orientational order that is not found in isotropic liquids. As the disclosed LCs are essentially ordered oils, emulsions containing droplets of nematic phase LC dispersed in aqueous phases can be created, or domains of LC can be contacted with aqueous phases without dissolution of the LC into the aqueous phase. A large number of methods can be used to create the LC dispersed phase, including sonication of LC in an aqueous phase, extrusion through a membrane, mechanical agitation, the use of a vortexing device and flow focusing, including flow focusing in microfluidic channels. In some embodiments, a concentration of surfactant below that which causes a configurational transition in the LC microdomains can be optionally added to the aqueous phase to facilitate the formation of the LC microdomains.

Various liquid crystals may be employed in the dispersed liquid crystal drops of the present invention. Examples of suitable liquid crystals, include, but are not limited to, 4-cyano-4'-pentylbiphenyl (5 CB), 7 CB, and 8 CB, and E7 and TL205. A large listing of suitable liquid crystals is presented in "Handbook of Liquid Crystal Research" by Peter J. Collings and Jay S. Patel, Oxford University Press, 1997, ISBN 0-19-508442-X. Polymeric liquid crystals are also suitable for use in the device and methods of the present invention. Because the devices and methods of the present invention may include contacting the liquid crystal with aqueous test solutions, preferred liquid crystals employed in the invention should be insoluble in water or have very limited solubility in water. Additionally, preferred liquid crystals employed in the invention should not react with water.

In certain embodiments of the present invention, the liquid crystal comprising the droplets is 4-cyano-4'-pentyl-bipheny-1 (5 CB). Although various types of liquid crystal may be employed, nematic and thermotropic liquid crystals are preferred. However, smectic liquid crystals formed from 8 CB are also suitable for use in the present invention. Suitable liquid crystals further include smectic C, smectic C*, blue phases, cholesteric phases, smectic A, and polymeric liquid crystals.

In certain embodiments, the material containing the dispersed liquid crystal droplets is an emulsion of liquid crystal droplets within another liquid, preferably within an aqueous buffer solution. The aqueous buffer solution is useful to facilitate the non-covalent interactions between the nanoparticle and the amphiphile of the nanoparticle-containing complexes described herein. The aqueous solution may also be buffer free. A variety of standard buffer solutions would be suitable.

The volume ratio of the LC to the aqueous buffer solution in the LC emulsions of these embodiments can vary. However, in some embodiments, the ratio of the initial volume of LC to the volume of aqueous buffer within the emulsion can be substantially less than one to one. In some such embodiments, the ratio is less than about 1/10, and in some such embodiments, the ratio is less than about 1/100.

In embodiments, the liquid crystal-based system comprises or consists of a plurality of dispersed liquid crystal microdomains, wherein each dispersed liquid crystal microdomain is confined by an interface formed with a surrounding medium, wherein a plurality of nanoparticles or a plurality of nanoparticle-amphiphile complexes are adsorbed at the interface. In any of the embodiments in this paragraph, the nanoparticles comprise or consist of an inorganic material (e.g., $SiO_2$). In any of the embodiments in this paragraph, the amphiphile of the nanoparticle-amphiphile complexes comprises or consists of a quaternary ammonium surfactant (e.g., an alkyl trimethylammonium halide). In any of the embodiments in this paragraph, the surrounding medium comprises or consists of an aqueous buffer solution. In any of the embodiments in this paragraph, each liquid crystal microdomain comprises or consists of a nematic liquid crystal (e.g., 4-cyano-4'-pentylbiphenyl). In any of the embodiments in this paragraph, the nanoparticles may be present in the liquid crystal-based system in an amount of from 1 weight % to 30 weight % (as compared to the total weight of the liquid crystal-based system). This includes from 2 weight % to 25 weight % and from 5 weight % to 15 weight %. In any of the embodiments in this paragraph, the amphiphile of the nanoparticle-amphiphile complex may be present in the liquid crystal-based system in an amount of from 0.001 mM to 0.1 mM (in the liquid crystal-based system). This includes from 0.002 mM to 0.02 mM and from 0.005 mM to 0.05 mM. In embodiments, the amount of the amphiphile (including the amounts disclosed herein) is less than an amount that would trigger an ordering transition in the liquid crystal microdomains absent the nanoparticle-amphiphile complex. In any of the embodiments in this paragraph, the buffer of the aqueous buffer solution may be present in the liquid crystal-based system in an amount of from 1 mM to 30 mM (in the liquid crystal-based system). This includes from 2 mM to 25 mM and from 5 mM to 15 mM. In any of the embodiments in this paragraph, the liquid crystal of the liquid crystal microdomains may be present in the liquid crystal-based system in an amount of from 0.1 vol % to 10 vol % (as compared to the total volume of the liquid crystal-based system). This includes from 0.1 vol % to 5 vol % and from 0.1 vol % to 1 vol %.

The disclosed systems and methods may include a test sample that may include the analyte of interest placed in contact with the liquid crystal microdomains. The test sample is the solution that is to be tested for the presence and/or quantification of the target analyte. Varying the volume ratio of the test sample to the liquid crystal in the microdomains (and thus the volume ratio of the test solution to the LC contained within an emulsion) may affect the sensitivity of the sensor.

In some embodiments, the LC is added directly to the test sample and a dispersion of LC emulsion droplets is generated within the sample volume. In some embodiments, the emulsion of LC droplets is created by sonication, mechanical agitation, homogenization using a homogenizer, by vortexing, or passage of the sample containing LC through an emulsifier. Many machines are described in the existing literature for formation of emulsions, and use of these machines is contemplated within the context of this disclosure.

In certain embodiments, the disclosed systems and methods are used to quantify the analyte present in the test sample. This can be done in a number of ways. For example, the percentage of radial or bipolar configuration droplets after contact with the test solution depends on the quantity of analyte in the test solution. Accordingly, quantification could be done by correlating configuration percentages to the percentages obtained from standardized samples of known concentration. As one skilled in the art would appreciate, quantification of analyte is not limited to such direct correlation, and there would be many ways to quantify a target analyte in a test sample from detector data. As a non-limiting example, a computer program based on testing of target analyte solutions of known concentration could be developed to analyze light scattering or fluorescence data from flow cytometry to directly calculate the quantity of target analyte present in a test sample without calculating the percentages of droplets having a given configuration.

The following example is offered for illustrative purposes only, and is not intended to limit the scope of the present invention in any way. Indeed, various modifications of the invention in addition to those shown and described herein will become apparent to those skilled in the art from the foregoing description and the following examples and fall within the scope of the appended claims.

III. Example

Environmentally Responsive Emulsions of Thermotropic Liquid Crystals with Exceptional Long-Term Stability and Enhanced Sensitivity to Aqueous Amphiphiles This example presents "proof of principle" for an LC emulsion-based analyte detection device, where the LC emulsion droplets are stabilized through absorbed nanoparticle-amphiphile complexes. The example demonstrates that the stabilized emulsion droplets interact with an analyte to impart an observable change in LC orientation, and provides evidence that the sensitivity and/or selectivity for a given analyte can be tuned or optimized by changing the chemical makeup of the nanoparticle-amphiphile complex.

Summary

This example reports colloidally stable emulsions of thermotropic liquid crystals (LCs) that can detect the presence of amphiphilic analytes in aqueous environments. This approach makes use of a Pickering stabilization strategy consisting of surfactant-nanoparticle complexes ($C_nTAB/SiO_2$, n=8, 12, 16) that adsorb to aqueous/LC droplet interfaces. This strategy can stabilize LC emulsions against coalescence for at least three months. Critically, these stabilized LC emulsions also retain the ability to respond to and report on the presence of model anionic, cationic, and nonionic amphiphiles (e.g., SDS, $C_{12}TAB$, $C_{12}E_4$) in aqueous solutions by undergoing "bipolar-to-radial" changes in LC droplet configurations that can be readily observed and quantified using polarized light microscopy. The results reveal these ordering transitions to depend upon the length of the hydrocarbon tail of the $C_nTAB$ surfactant used to form the $SiO_2/C_nTAB$ stabilizing complex. In general, increasing the $C_nTAB$ surfactant tail length leads to droplets that respond at lower analyte concentrations. Moreover, LC emulsions stabilized by longer-tailed $SiO_2/C_{16}TAB$ complexes, in particular, respond to concentrations of SDS that are two orders of magnitude lower (in the micromolar range) than those required to trigger similar responses in bare LC droplets. Finally, this example demonstrates that these colloidally stable LC droplets can report the presence of rhamnolipid, a biosurfactant produced as a virulence factor by the bacterial pathogen *Pseudomonas aeruginosa*, at biologically relevant concentrations.

Overall, the results demonstrate this Pickering stabilization strategy can be used to both confer substantially improved colloidal and shelf-life stability to LC droplets and provide strategies to tune the sensitivities of these droplet-based sensors to environmental analytes. These two advances provide new and useful tools that should increase the potential practical utility of these responsive soft materials as platforms for the detection and reporting of chemical and biological analytes.

Introduction

Interactions between amphiphilic molecules and thermotropic liquid crystals (LCs) hosted at aqueous interfaces can promote changes in the orientation of the LCs that translate, in many cases, to optical responses that can be readily observed or reported using optical methods (e.g., using polarized light or light scattering). The range of molecules that can promote changes in LC orientation in this way is broad, and extends from synthetic surfactants to more complex components of biological systems, including lipids, proteins, bacterial toxins, cells, and viruses. Aqueous/LC interfaces thus provide a practical basis for the development of platforms for chemical and biomolecular sensing.

Past studies have reported that micrometer-scale droplets of LC dispersed in aqueous phases (e.g., LC-in-water emulsions) provide a versatile approach for designing droplet-based sensors that can respond sensitively to the presence of a wide range of amphiphiles in aqueous environments. These LC emulsions are straightforward to prepare and deploy and they enable real-time, label-free detection of toxins and other analytes with sensitivities that depend, in general, upon the concentration and structure of the analyte. As one important example, past studies demonstrate that LC emulsions can detect and report the presence of lipid A, a component of bacterial endotoxins, at concentrations as low as 1 pg/mL in water.

While these and other past studies reveal the remarkable sensitivity of LC-in-water emulsions, the practical utility and applied potential of these liquid droplets remains limited by the fact that they are not colloidally stable. The liquid droplets in these emulsions typically aggregate, coalesce, or wet adjacent surfaces over short time periods (e.g., on scales of minutes to hours; FIG. 1A), which creates technical challenges associated with accuracy and predictability of response over time, as well as issues associated with preparation and storage for potential practical applications.

Poor colloidal stability of LC emulsions has been addressed by coating LC droplets with amphiphilic polymers or polymer-based multilayers that can prevent droplet coalescence. These methods can prevent the coalescence of individual droplets, but they can also be compositionally complex and they introduce barriers through which analytes must diffuse to reach the LC interface, both of which can influence the timing and/or sensitivity of response.

Figure 1B:
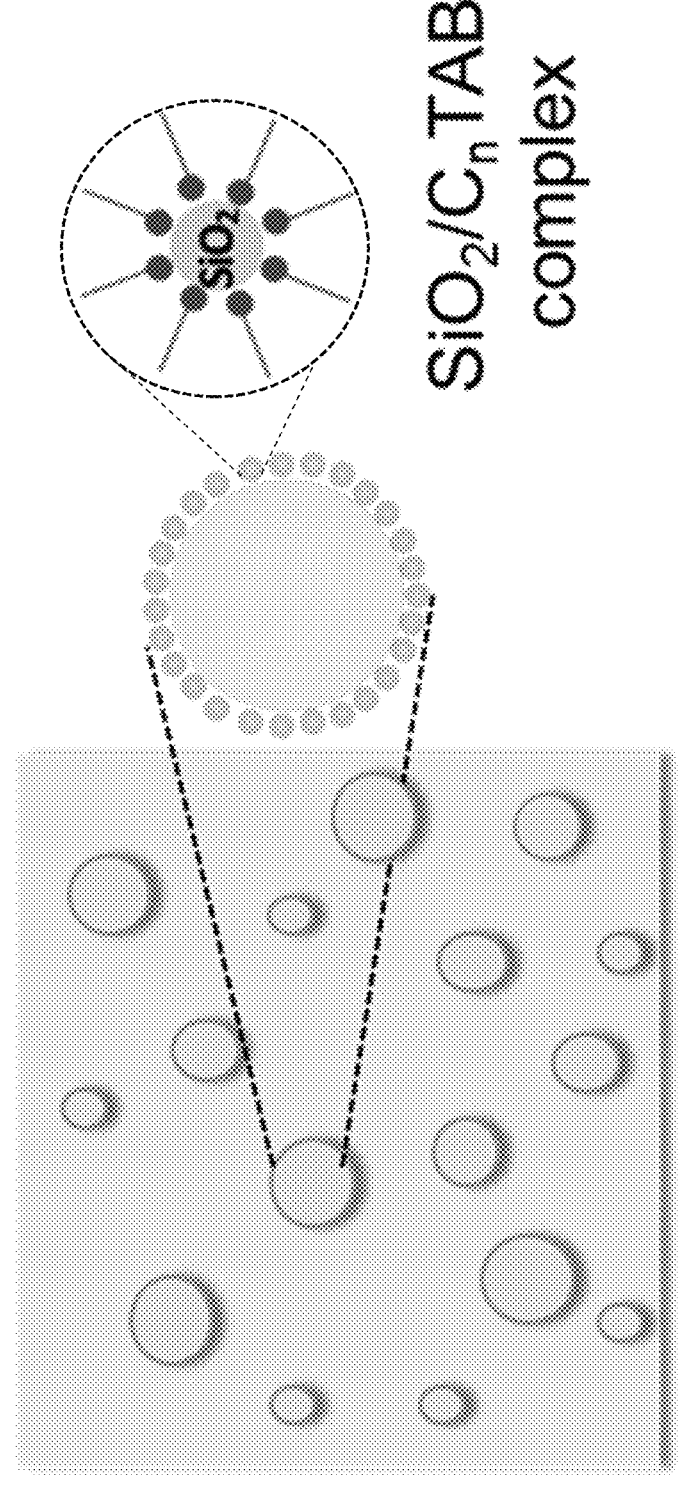
FIG. 1B is a schematic illustration of Pickering LC emulsions stabilized by nanoparticle-surfactant complexes $(SiO_2/C_nTAB, n=8, 12, 16)$.

This Example uses a strategy based on so-called "Pickering emulsions" created by the adsorption of nanoparticles to the oil/water interfaces of droplets suspended in aqueous environments (e.g., FIG. 1B). It was hypothesized that this approach could be used to both (i) provide colloidal stability to LC emulsion droplets and (ii) provide a means of influencing or fine-tuning the orientational responses, or other behaviors, of LC droplets in aqueous environments (e.g., by varying the size or surface composition of the adsorbed nanoparticles, etc.).

The adsorption of whey protein microgel particles to aqueous/LC interfaces has been reported to stabilize LC droplet emulsions for up to 14 days, and that these stabilized droplets permit the transport of synthetic amphiphiles such as sodium dodecyl sulfate (SDS) to the LC-water interface to trigger ordering transitions. (Dan, A. et al. *Langmuir* 2020, 36, 10091-10102.) However, the concentrations of SDS required to induce an LC response in that study were reported to be higher than those required to induce transitions in bare LC droplets, suggesting that the properties of the stabilizing protein microgel particles used in that study also influence (and, in some cases, diminish) droplet sensitivity. By contrast, this Example reports new designs of nanoparticle-based Pickering-type LC emulsions that exhibit both significantly enhanced colloidal stability and improved sensitivity toward aqueous amphiphiles.

The approach in this Example makes use of inorganic nanoparticle/surfactant complexes to prepare Pickering emulsions of the nematic LC 4-cyano-4'-pentylbiphenyl (5CB) in water (FIG. 1B). These complexes are comprised of silica ($SiO_2$) nanoparticles and cationic trimethylalkylammonium bromide surfactants ($C_n$TAB, n=8, 12, 16). The results show that $SiO_2$/$C_n$TAB complexes adsorb to LC droplet interfaces and stabilize LC emulsions against coalescence for at least three months. Stabilized droplets that sediment over this time period can be readily re-dispersed by gentle shaking, demonstrating the robust colloidal stability of this system (as depicted in FIG. 1B); in contrast, bare LC droplets flocculate and coalesce within hours of preparation, leading to bulk phase separation (as shown in FIG. 1A).

Figure 2:
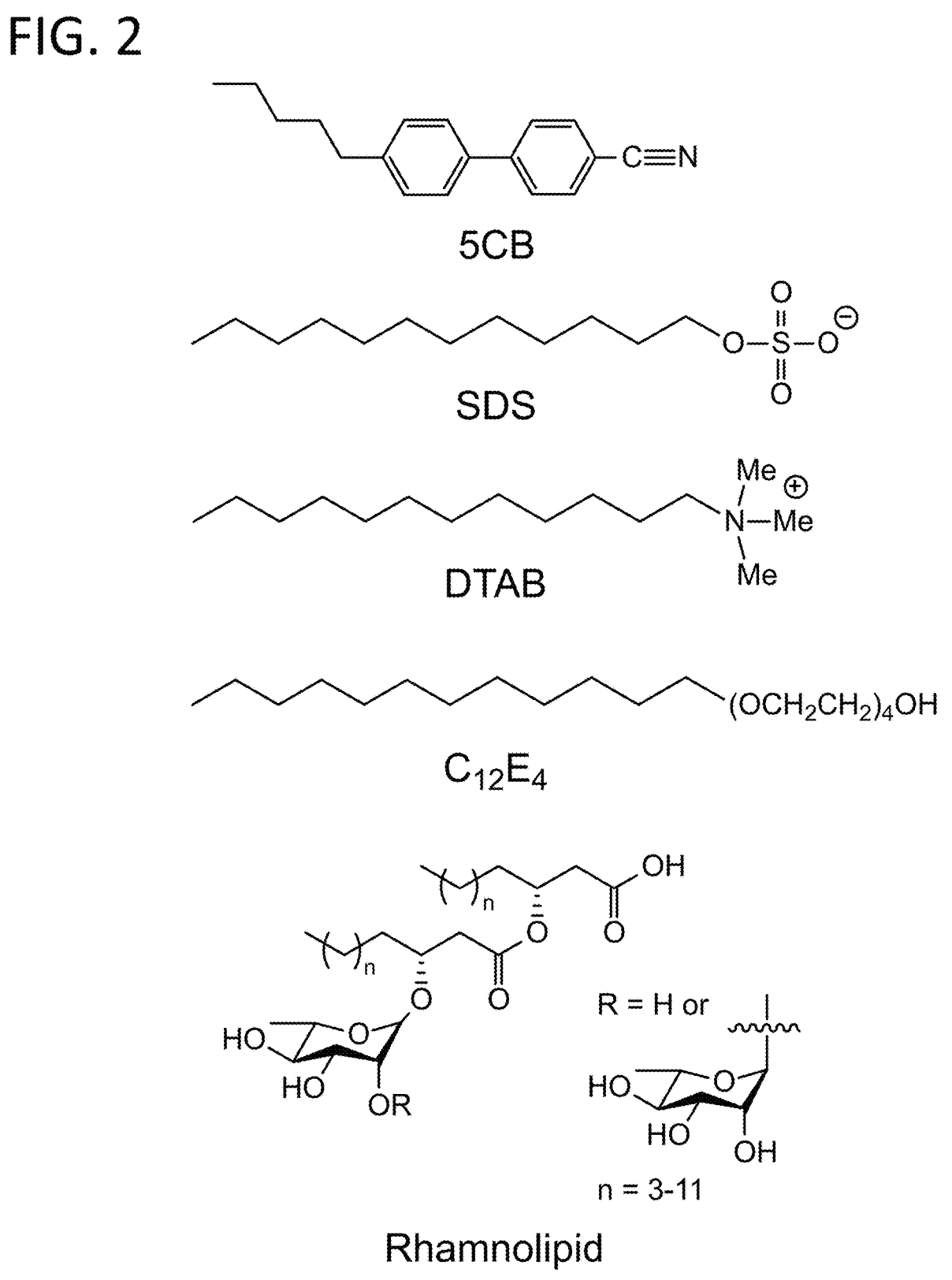

These nanoparticle-stabilized emulsions also respond upon exposure to model anionic, cationic, and nonionic amphiphiles (FIG. 2) by undergoing diagnostic "bipolar-to-radial" transitions that can be readily observed using polarized light microscopy. The results reveal that the bulk concentration of each amphiphile required to trigger these LC ordering transitions depends upon the hydrocarbon tail length of the $C_n$TAB surfactant used to form the $SiO_2$/$C_n$TAB stabilizing complex. In general, increasing the $C_n$TAB surfactant tail length leads to droplets that respond at lower analyte concentrations, demonstrating that this approach can be used to tune the sensitivities of these stabilized LC droplets. LC emulsions stabilized by $SiO_2$/$C_{16}$TAB, in particular, respond to SDS at concentrations in the micromolar range (5 μM) that are orders of magnitude lower than those required to trigger similar responses in bare LC droplets (e.g., 0.3 mM), providing further support for this view. These droplets also respond to concentrations of cationic and nonionic surfactants that are significantly higher than those required using anionic SDS, demonstrating strategies that could also be used to impart some degree of selectivity using this approach.

Finally, this Example demonstrates that these stabilized LC droplets can be used to report the presence of rhamnolipid (FIG. 2), a biosurfactant produced as a virulence factor by the bacterial pathogen *Pseudomonas aeruginosa*, at biologically relevant concentrations. When combined, the results reveal Pickering LC emulsions stabilized by $SiO_2$/$C_n$TAB complexes to provide new and useful approaches for the design of LC droplet-based sensors with substantially improved colloidal stability, as well as guidance that is useful for enhancing or tuning the sensitivities and selectivity and, thus, also the practical utility, of these responsive soft materials as platforms for the detection of chemical and biological analytes.

Materials and Methods

Materials.

The aqueous silica dispersion Ludox® TMA (34 wt. % suspension in $H_2O$, surface area of 140 $m^2$ $g^{-1}$, pH of 7, density of 1.23 g $cm^{-3}$, molecular weight of 60.08 g $mol^{-1}$, diameter of 22 nm), trimethyloctylammonium bromide ($C_8$TAB), dodecyltrimethylammonium bromide ($C_{12}$TAB), hexadecyltrimethylammonium bromide ($C_{16}$TAB), sodium dodecyl sulfate (SDS), tetra(ethylene glycol)monododecyl ether ($C_{12}E_4$), and sodium chloride were purchased from Sigma-Aldrich (St. Louis, MO). The nematic thermotropic LC 4-cyano-4'-pentylbiphenyl (5CB) was purchased from TCI America (Portland, OR). Rhamnolipids, 90% pure (mixture of glycolipids purified from *Pseudomonas aeruginosa*) were purchased from AGAE Technologies (Corvallis, OR). All chemicals were used without any purification unless otherwise noted. Glass slides for microscopy measurements were obtained from ThermoFisher Scientific (Rockford, IL). Deionized water with an electrical resistivity of 18.2 mΩ·cm was used in all experiments.

Preparation of Nanoparticle-Surfactant Complexes.

Nanoparticle-surfactant complexes were prepared as follows. Briefly, the commercial silica dispersion Ludox® TMA was diluted with deionized water to obtain a dispersion of 20 wt. % silica nanoparticles. In this case, silica nanoparticles were dispersed using an ultrasound probe operating at an amplitude of 50% for 5 min. Stock solutions of 0.02 mM $C_n$TAB were prepared in 20 mM NaCl to facilitate the adsorption of surfactant molecules onto the silica nanoparticle surface. An equal volume of surfactant solution (10 mL) was added drop-by-drop to the silica nanoparticle dispersion and mixed using an ultrasonic bath to prevent particle aggregation and favor surfactant adsorption and distribution over the nanoparticle surface. The final dispersion consisting of 10 wt. % silica nanoparticles and 0.01 mM $C_n$TAB in 10 mM NaCl solution was allowed to mix in the ultrasonic bath for 30 min. Prior to LC emulsion preparation, $SiO_2$/$C_n$TAB dispersions were aged for 4 days to allow the system to equilibrate and ensure a uniform distribution of surfactant over the nanoparticle surface.

Dynamic interfacial tension measurements. Dynamic interfacial tension measurements were obtained using an optical contact angle tensiometer OCA 15 EC (DataPhysics instruments, Filderstadt, Germany). This instrument utilizes the pendant drop method to calculate the interfacial tension. A drop of 5CB (10 μL) was formed at the needle tip inside a cuvette filled with either 10 mM NaCl aqueous solution, 0.01 mM $C_n$TAB solution (10 mM NaCl), 10 wt. % $SiO_2$ nanoparticle dispersion (10 mM NaCl), or $SiO_2$/$C_n$TAB complexes (10 wt. % $SiO_2$, 0.01 mM $C_n$TAB, 10 mM NaCl). Images of the drop were acquired by an integrated camera at a frame rate of 20 frames per second (fps) and a resolution of 752×480 pixels. Subsequently, the software (SCA 20) recorded the geometry of the drop and the Young-Laplace equation was used to determine the interfacial tension. Interfacial tension data was collected at a speed of 4 measurements per minute and the equilibrium time was 1 hour for each drop. All experiments were carried out at 24° C. and the reported values represent the means and standard deviations of three different measurements.

Preparation of LC Emulsions.

LC-in-water emulsions were prepared by emulsifying 4 μL of nematic 5CB in 1.996 mL of an aqueous 10 mM NaCl dispersion containing 10 wt % of $SiO_2$/$C_n$TAB complexes or bare $SiO_2$ nanoparticles using a homogenizer (Fisherbrand™ Laboratory Homogenizer, Model 125) for 1 min at 10,000 rpm. In addition, LC emulsions without emulsifiers were prepared for control experiments by homogenizing 4 μL 5CB in 1.996 mL of a 10 mM NaCl aqueous solution. Emulsions consisting of bare LC droplets were used within 3 hours of preparation. Here it is noted that, in the initial experiments, a design of experiments was executed where the nanoparticle concentration, LC-to-water ratio, and homogenization time were varied to determine the most useful procedure for LC emulsion preparation, selecting the procedure outlined above.

Evaluation of Emulsion Stability by Droplet Size Measurements.

The colloidal stability of LC emulsions was assessed by measuring LC droplet size distributions with an Olympus BX51 optical microscope equipped with a 100× objective. Bright field micrographs of the LC droplets were captured by a Canon EOS Rebel T1i camera connected to a computer and controlled through Digital Photo Professional imaging software version 4.13.10. Droplet size distributions were determined for LC emulsions stabilized by $SiO_2/C_nTAB$ complexes and LC emulsions prepared with bare $SiO_2$ nanoparticles (i.e., not mixed with $C_nTAB$ surfactants) as a control sample. These measurements were obtained at different time points over a period of 90 days for $SiO_2/C_nTAB$-stabilized LC emulsion or 30 days for the control samples. Before optical characterization, the LC emulsions were hand-mixed by shaking gently to disperse the LC droplets.

In both scenarios, 4 μL of LC emulsion was added to 20 μL of deionized water previously deposited onto a glass slide. After 5 minutes, bright field micrographs were acquired. The surface average diameter $D_{[3,2]}$ was calculated by analysis of at least 100 droplets for each sample using Image J software. Frequency histograms that present LC droplet size distributions were constructed using Statgraphics Centurion 18 software. The reported values represent average diameters and standard deviations of at least three different experiments on triplicate samples.

The $D_{[3,2]}$ was determined by the following equation:

$$D_{[3,2]} = \frac{\Sigma_i N_i D_i^3}{\Sigma_i N_i D_i^2}$$

where $N_i$ is the total number of droplets with diameter $D_i$. The droplet size distribution of bare LC droplets was also measured. In this case, the bare LC emulsion sample was not diluted with deionized water. Thus, 20 μL of bare LC emulsion was deposited directly onto a glass slide. Because bare LC emulsions are only stable over short time periods, all measurements were made within 3 h of preparation.

Optical Characterization of LC Droplets.

Ordering transitions in LC droplets were characterized using an Olympus BX51 optical microscope equipped with a 100× objective under a cross polarizer. Here, the LC droplets were exposed to increasing concentrations of amphiphilic analytes such as anionic SDS, cationic $C_{12}TAB$, nonionic $C_{12}E_4$, and rhamnolipid. All surfactant solutions were prepared in deionized water. Stock solutions of SDS, $C_{12}TAB$, $C_{12}E_4$, and rhamnolipid were prepared at 1 mM, 3 mM, 1 mM, and 100 μg/mL, respectively.

Optical characterization was performed for LC emulsions stabilized by $SiO_2/C_nTAB$ complexes and two control samples: LC droplets dispersed in 10 mM NaCl aqueous solution, and LC emulsions prepared with bare $SiO_2$ nanoparticles (i.e., not mixed with $C_nTAB$ surfactants). Polarized light micrographs were acquired at different time points over a period of 90 days for stabilized LC droplets exposed to the surfactant SDS. Because it was found that the ordering transitions induced by SDS in the $SiO_2/C_nTAB$-stabilized LC droplets were generally consistent at different surfactant concentrations over this period, subsequent experiments were performed with the surfactants $C_{12}TAB$ and $C_{12}E_4$ only on day 1 after emulsion preparation. In the case of the experiments with the biosurfactant rhamnolipid, the optical characterization was conducted after 16 days of emulsion storage time. The optical characterization of bare LC droplets was conducted within 3 h of preparation.

Before optical characterization, the stabilized LC emulsions were hand-mixed by shaking gently to disperse the LC droplets (this procedure was performed from day 1). For experiments with SDS, $C_{12}TAB$ and $C_{12}E_4$, 4 μL of LC emulsion were added to 20 μL of surfactant solution previously deposited onto a glass slide. Prior to the experiments, the glass slides were rinsed using ethanol and water and then dried under nitrogen, at least for three cycles. After 10 minutes, polarized light micrographs were acquired. For experiments involving rhamnolipid, 40 μL of stabilized LC emulsion were mixed with 200 μL of the rhamnolipid solution. This mixture was aged for at least 1 hour before optical characterization of LC droplets. Here, 20 μL of the mixture was deposited onto a glass slide, and polarized light micrographs were obtained after 5 minutes.

Results and Discussion $SiO_2$ nanoparticles and $C_nTAB$ surfactants were selected as model components for the studies described above. As opposed to emulsions formed by $SiO_2$ (or other) nanoparticles alone, this mixed nanoparticle-surfactant system provides opportunities to vary composition and surfactant structure (e.g., tail length) so as to impact both colloidal stability and the sensitivity of the response of the LC droplets to added analytes.

Moreover, a stabilizing system based on a formulation using cationic surfactants provides opportunities to decorate LC droplet surfaces with particles so as to permit discrimination amongst other charged amphiphiles, providing a way to further modulate response and introduce selectivity into these systems. Additional detail and discussion on each of these key points are provided in the sections below.

Characterization of the Colloidal Stability of LC-in-Water Pickering Emulsions

The work was begun by characterizing the colloidal stabilities of LC droplets stabilized by nanoparticle-surfactant complexes formed using monodisperse $SiO_2$ nanoparticles (22 nm in diameter) and three different $C_nTAB$ surfactants of different alkyl tail lengths (n=8, 12, or 16). LC-in-water emulsions of 5CB were prepared in the presence of $SiO_2/C_nTAB$ complexes suspended in 10 mM NaCl (0.2 v/v % of 5CB), and then the colloidal stability of the emulsions was characterized as a function of storage time over a period of 90 days. Media containing NaCl was used in these experiments to facilitate the adsorption of surfactant molecules to the $SiO_2$ nanoparticle surface.

Two complementary approaches were used to characterize colloidal stability: (i) monitoring changes in the turbidity of the emulsions and (ii) characterizing changes in LC droplet size over time.

Photographs of $SiO_2/C_nTAB$-stabilized LC emulsions were taken after 30 days of storage time. The emulsions remained turbid over this period and phase separation was not observed. Although sedimentation of the LC droplets was observed with time as a result of differences in density between the LC and the water phases, the droplets did not coalescence over this time and were readily re-dispersed after gentle manual shaking. The three $C_nTAB$ surfactants used to form the nanoparticle-surfactant complexes led to similar levels of colloidal stability in this qualitative context.

Figure 3:
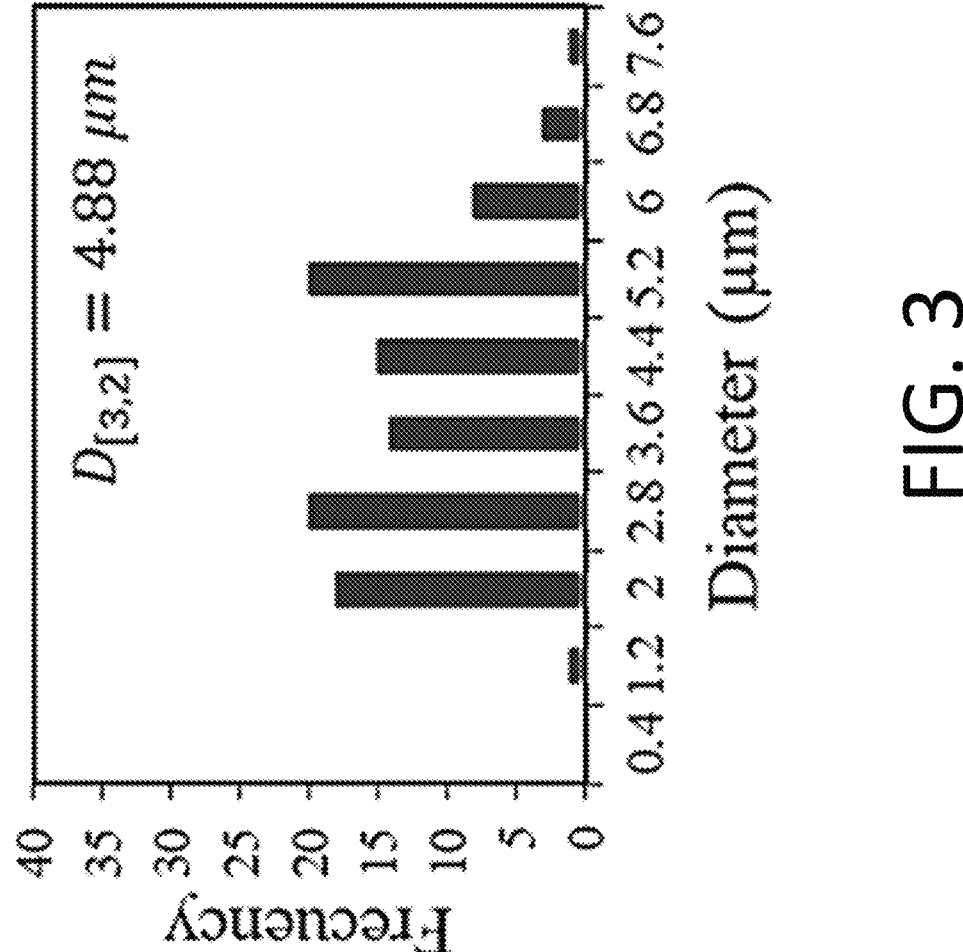
FIG. 3 is a graph showing the size distribution of bare LC droplets dispersed in 10 mM NaCl. The scale bar corresponds to 20 μm. The frequency histogram represents the distribution of 100 droplet size values obtained from bright field microscopy images. These values were determined using the 'Image J' software and the histogram was constructed using the 'Statgraphics Centurion 18' software. The surface average diameter $(D_{[3,2]})$ is shown on the upper right part of the graph.

In contrast, bare LC droplets (formed by creating conventional LC-in-water emulsions in the absence of nanoparticle-surfactant complexes or other stabilizers) coalesced within hours of emulsion preparation. In these cases, the LC and water phases completely separated within 48 hours of emulsion preparation. See also FIG. 3.

Figure 4:
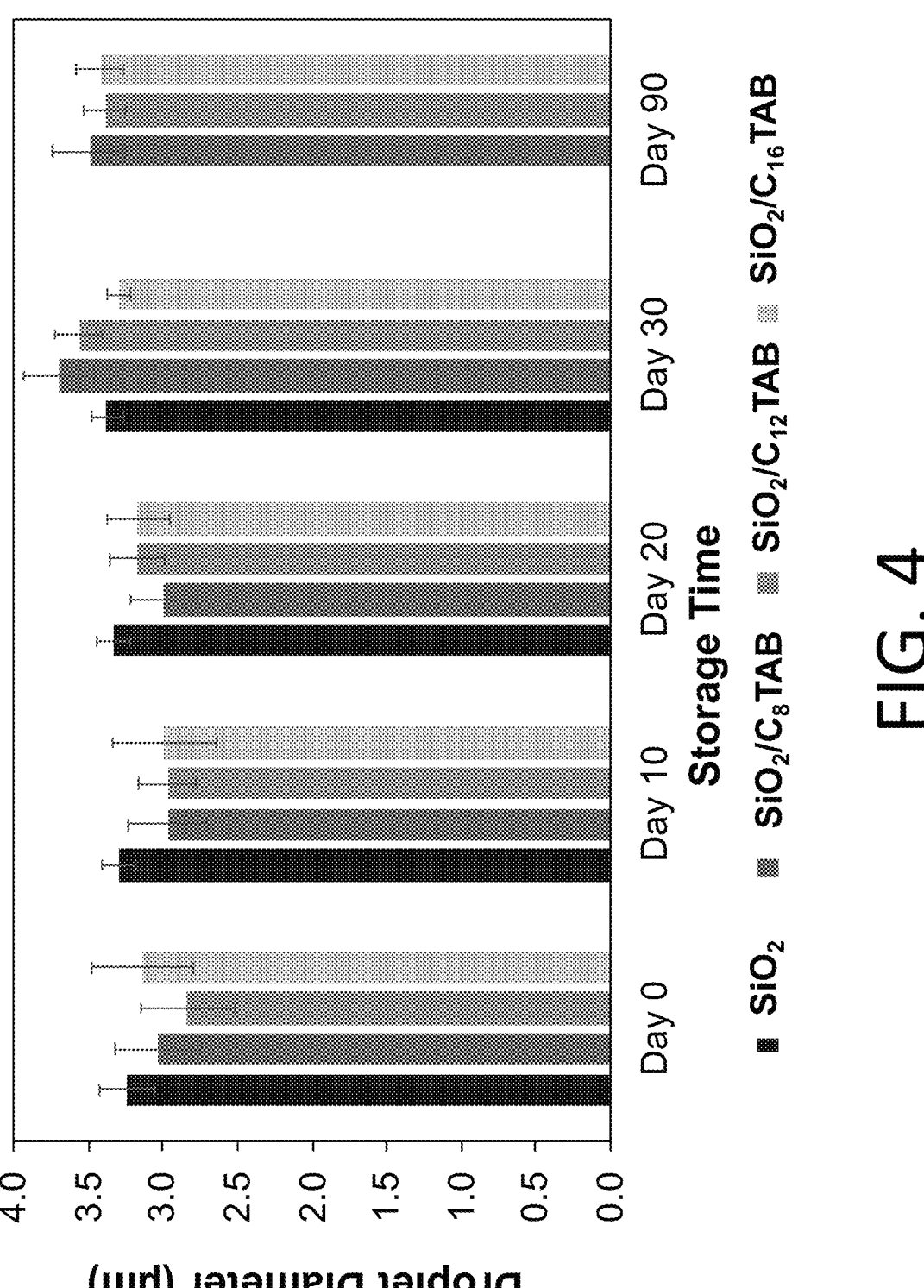
FIG. 4 is a bar graph showing droplet diameter as a function of storage time for Pickering LC emulsions prepared using $SiO_2$ nanoparticles complexed with $C_8TAB$ (red bars), $C_{12}TAB$ (green bars) or $C_{16}TAB$ (yellow bars) surfactants. After the day of emulsion preparation (labeled Day 0), the emulsions were hand-mixed prior to the droplet size measurements to disperse sedimented LC droplets. Control measurements of LC droplet diameters for Pickering LC emulsions prepared using $SiO_2$ nanoparticles without added cationic $C_nTAB$ surfactant (blue bars) for up to 30 days after preparation are also shown. The reported values represent the average and standard deviations of three independent experiments with triplicate samples.

Droplet size distributions for $SiO_2/C_nTAB$-stabilized LC emulsions were also measured over a period of 90 days. As shown in FIG. 4, droplet sizes did not change significantly under these conditions and no apparent differences in behavior as a function of $C_nTAB$ length were observed (diameters ranged from 3.0 μm to 3.9 μm for $SiO_2/C_8TAB$, 2.8 μm to 3.6 μm for $SiO_2/C_{12}TAB$, and 3.0 μm to 3.5 μm for $SiO_2/C_{16}TAB$ complexes; see Table 1). When combined, the results of these experiments demonstrate the robust colloidal stability of this LC Pickering emulsion system.

before and after exposure to aqueous solutions of target amphiphiles. For these experiments, Pickering LC emulsions were prepared as described above and polarized light microscopy was used to characterize ordering transitions in the LC droplets. For all studies described below, the concentration of the $C_nTAB$ surfactants used to stabilize the droplets was maintained constant at 0.01 mM because this low $C_nTAB$ concentration does not, itself, promote ordering transitions in LC droplets.

LC droplets stabilized by $SiO_2/C_nTAB$ complexes (10 wt %/0.01 mM, in 10 mM NaCl) were found to exhibit 'bipolar' configurations similar to those observed in past studies

TABLE 1

Droplet diameters ($D_{[3,2]}$) of Pickering LC-in-water emulsions stabilized by $SiO_2/C_nTAB$ complexes (n = 8, 12, or 16) at different storage times. These values were obtained from bright field microscopy images of at least 100 droplets, and they were determined using 'Image J' software. As shown in this table, we carried out three independent experiments with triplicate samples for each $SiO_2/C_nTAB$ complex. The reported values in this table correspond to the mean and standard deviation. These results were used to construct size distributions.

Droplet Diameter (μm)

| Sample | Day 0 | | | Day 10 | | | Day 20 | | | Day 30 | | | Day 90 | | |
|---|---|---|---|---|---|---|---|---|---|---|---|---|---|---|---|
| | n = 8 | n = 12 | n = 16 | n = 8 | n = 12 | n = 16 | n = 8 | n = 12 | n = 16 | n = 8 | n = 12 | n = 16 | n = 8 | n = 12 | n = 16 |
| $C_nTAB$ 1.1 | 2.9 | 3.3 | 3.3 | 2.8 | 3.1 | 2.9 | 3.0 | 3.1 | 2.9 | 3.8 | 3.6 | 3.2 | 3.4 | 3.3 | 3.4 |
| $C_nTAB$ 1.2 | 3.3 | 3.3 | 3.0 | 2.6 | 2.9 | 3.1 | 3.0 | 3.1 | 3.1 | 3.5 | 3.8 | 3.3 | 3.5 | 3.5 | 3.3 |
| $C_nTAB$ 1.3 | 3.0 | 2.6 | 3.3 | 2.9 | 2.9 | 2.5 | 3.3 | 3.1 | 3.1 | 3.8 | 3.6 | 3.4 | 3.2 | 3.4 | 3.6 |
| $C_nTAB$ 2.1 | 2.7 | 2.5 | 3.9 | 3.0 | 3.2 | 3.5 | 2.8 | 2.9 | 3.2 | 4.1 | 3.4 | 3.5 | 3.6 | 3.2 | 3.4 |
| $C_nTAB$ 2.2 | 2.9 | 2.7 | 3.2 | 3.1 | 3.0 | 3.1 | 2.6 | 3.1 | 3.4 | 3.6 | 3.4 | 3.2 | 3.3 | 3.5 | 3.6 |
| $C_nTAB$ 2.3 | 2.7 | 2.7 | 2.9 | 2.9 | 3.0 | 3.5 | 2.9 | 3.4 | 3.5 | 3.6 | 3.5 | 3.5 | 3.2 | 3.5 | 3.2 |
| $C_nTAB$ 3.1 | 3.4 | 3.0 | 2.7 | 2.8 | 3.1 | 3.0 | 3.2 | 3.1 | 2.9 | 3.5 | 3.5 | 3.6 | 3.8 | 3.6 | 3.6 |
| $C_nTAB$ 3.2 | 3.5 | 2.6 | 2.9 | 3.5 | 3.0 | 2.6 | 3.1 | 3.4 | 3.0 | 4.6 | 3.6 | 3.6 | 3.8 | 3.1 | 3.7 |
| $C_nTAB$ 3.3 | 3.1 | 2.8 | 3.0 | 3.1 | 2.5 | 2.9 | 3.1 | 3.4 | 3.4 | 4.5 | 3.7 | 3.4 | 3.8 | 3.2 | 3.8 |
| Mean | 3.0 | 2.8 | 3.1 | 3.0 | 3.0 | 3.0 | 3.0 | 3.2 | 3.2 | 3.9 | 3.6 | 3.4 | 3.5 | 3.4 | 3.5 |
| Standard Deviation | 0.3 | 0.3 | 0.3 | 0.3 | 0.2 | 0.4 | 0.2 | 0.2 | 0.2 | 0.4 | 0.1 | 0.2 | 0.3 | 0.2 | 0.2 |

40

Here it is noted that, as a control, LC emulsions were also prepared using $SiO_2$ nanoparticles without added $C_nTAB$ cationic surfactant. The nanoparticles were found to stabilize the emulsions for at least 30 days (FIG. 4). As discussed in greater detail below, however, other experiments using polarized light microscopy to characterize optical transitions in these materials demonstrated that the presence of $C_nTAB$ had additional positive impacts on droplet sensitivity. As a result, the sections below focus on the stabilization of LC emulsions using $SiO_2/C_nTAB$ complexes.

Figure 5A:
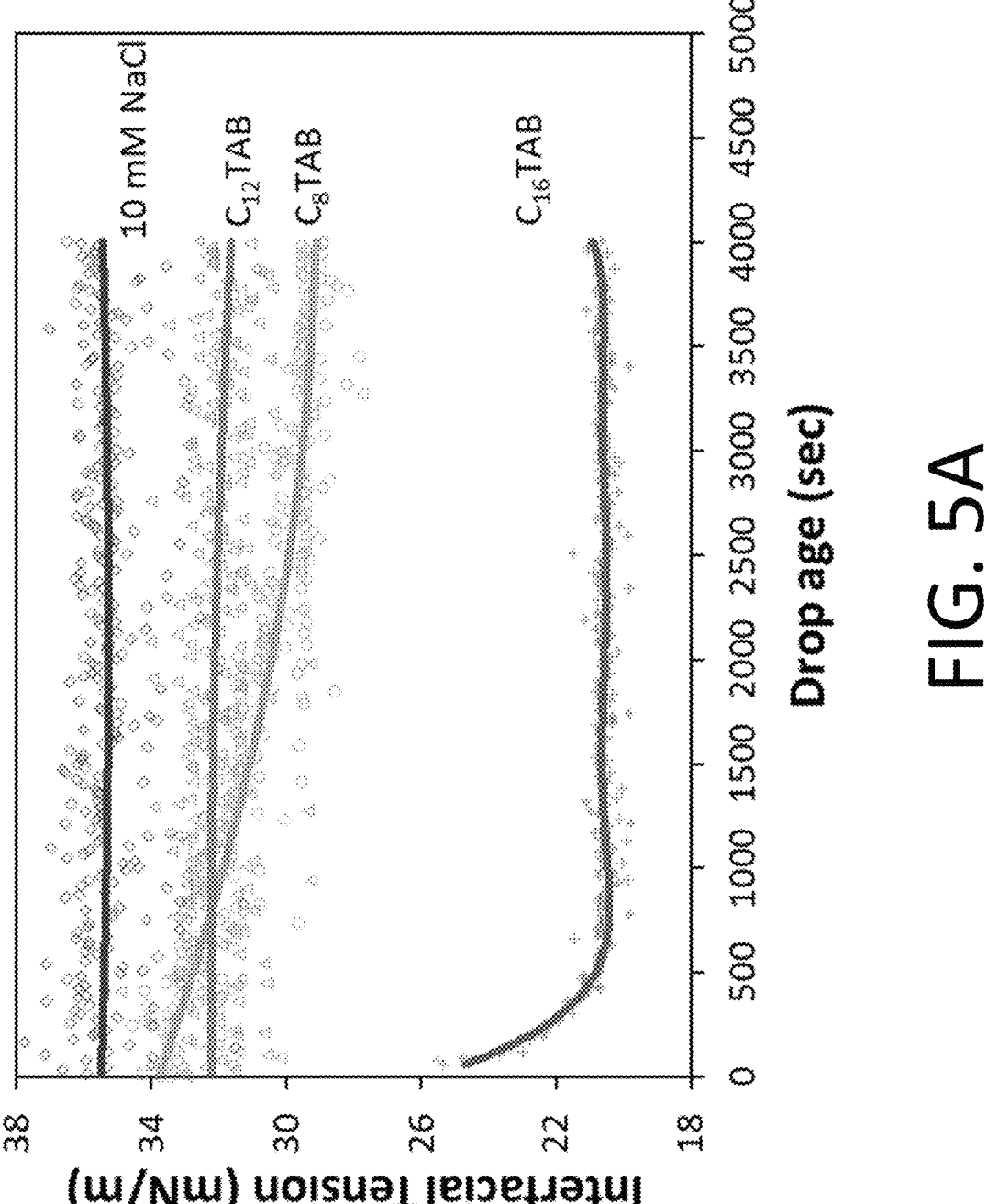
FIG. 5A is graph showing results of interfacial tension measurements for 5CB in 10 mM NaCl aqueous solution and $C_n$TAB surfactants only for n=8, 12, 16.
Figure 5B:
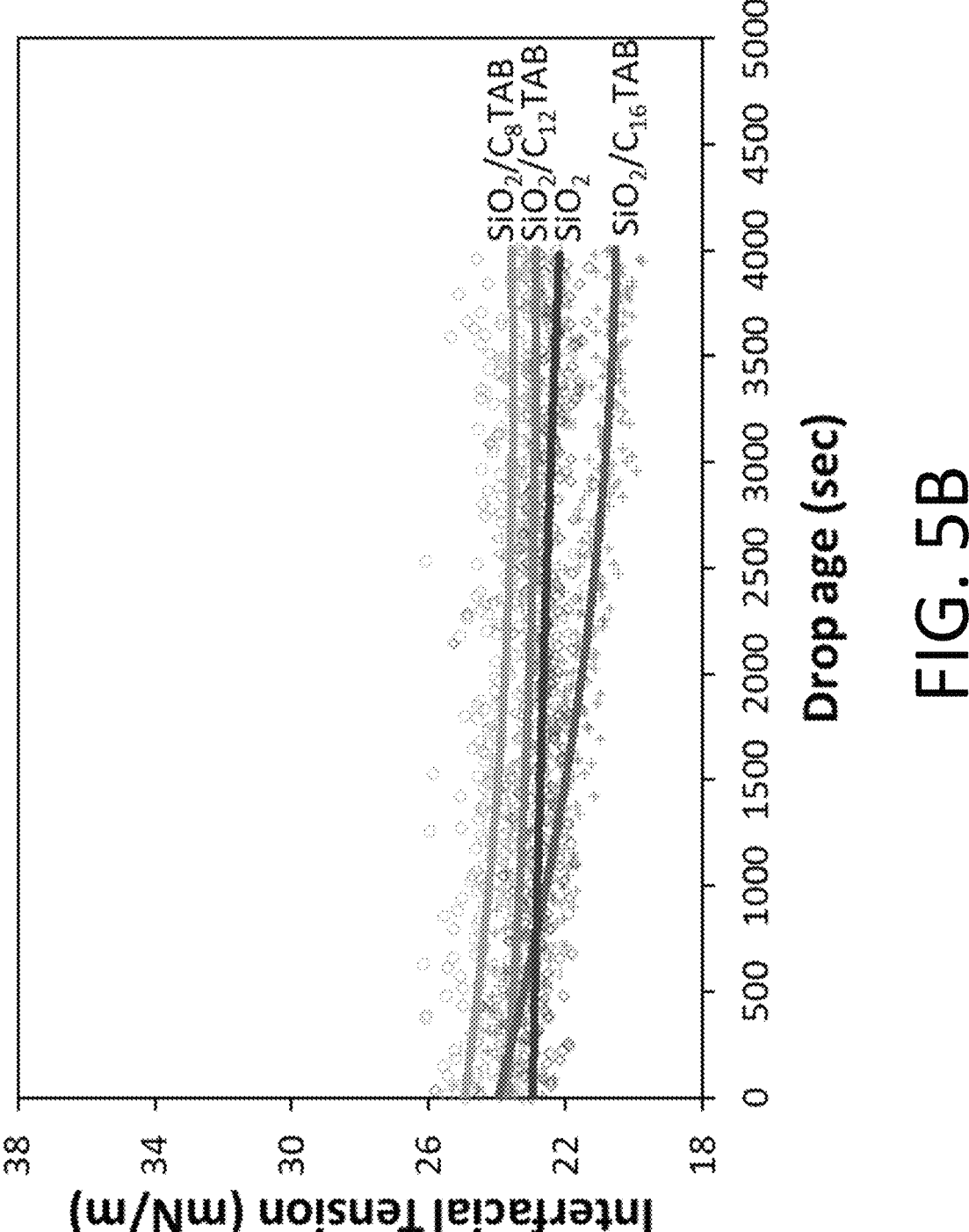
FIG. 5B is a graph showing results of interfacial tension measurements for $SiO_2$ in 10 mM NaCl aqueous solution and $SiO_2/C_n$TAB complexes for n=8, 12, 16.

Finally, it is noted that, to complement the emulsion stability studies described here, interfacial tension (IFT) measurements were performed to characterize the adsorption of the $SiO_2/C_nTAB$ complexes to the LC-water interface. The results of the IFT measurements (see FIGS. 5A and 5B) show that the overall change in the magnitude of the IFT promoted by these complexes was only slightly influenced by surfactant tail length, with the largest effect observed for the $SiO_2/C_{16}TAB$ surfactant complexes. These results are consistent with the observations that the three nanoparticle-surfactant complexes investigated here adsorb to the LC-water interface and are effective LC emulsion stabilizers.

Figure 6A:
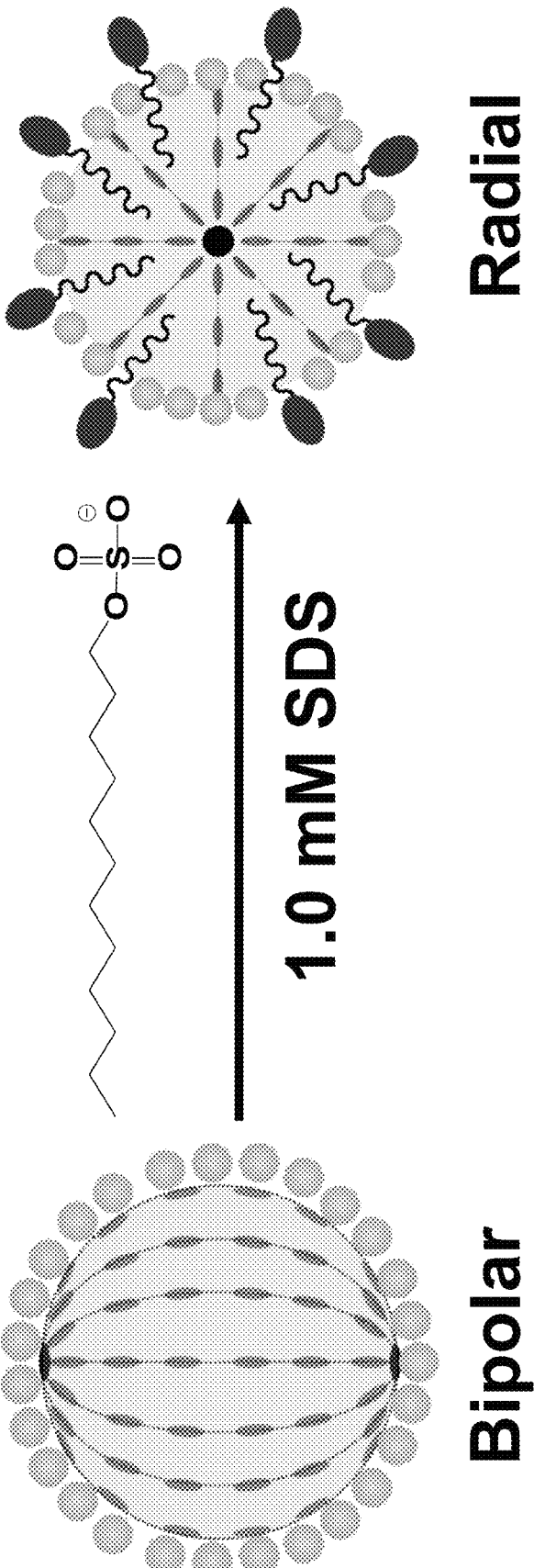
FIG. 6A shows ordering transitions of LC droplets stabilized by nanoparticle-surfactant ($SiO_2/C_n$TAB) complexes, with a schematic illustration of $SiO_2/C_n$TAB-stabilized LC droplets with the LC director profiles (dotted lines) in the bipolar (left) and radial (right) configurations, before and after addition of surfactant, respectively. The characteristic defects for each configuration are represented as black dots.
Figure 6B:
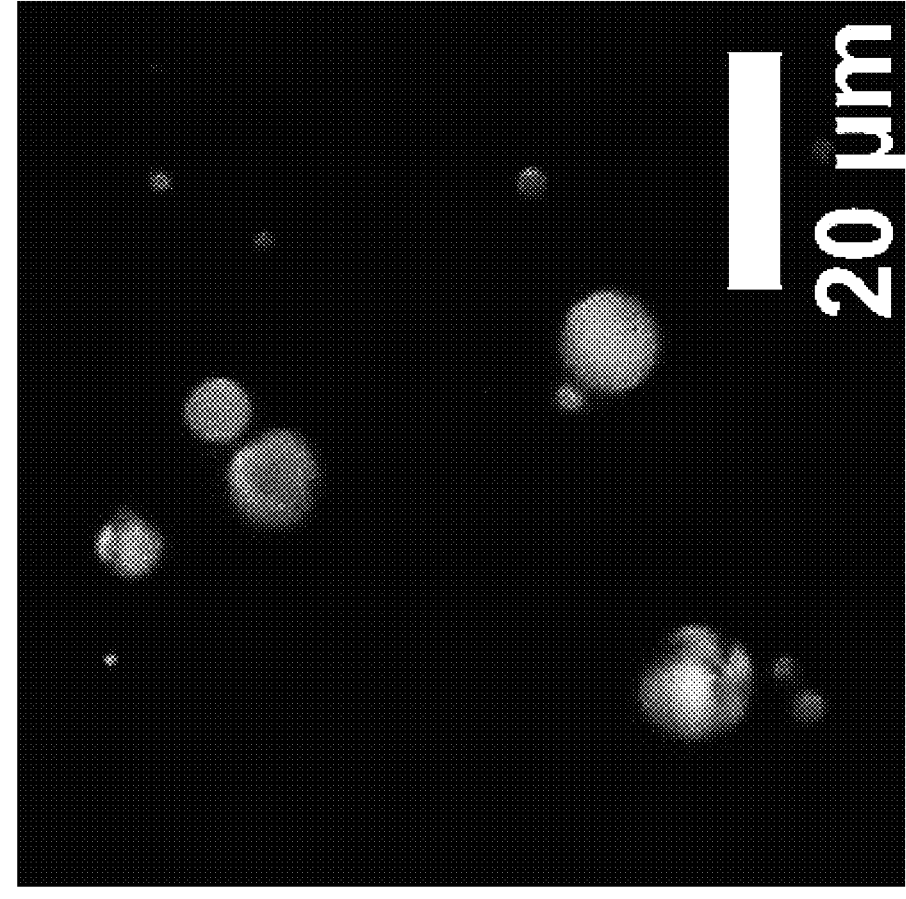
FIG. 6B is a polarized-light micrograph of $SiO_2/C_{16}$TAB-stabilized LC droplets dispersed in water in the bipolar configuration before addition of the surfactant SDS.

Ordering Transitions Induced by SDS in LC Droplets Stabilized by $SiO_2/C_nTAB$ Complexes Additional experiments were performed to characterize optical transitions in $SiO_2/C_nTAB$-stabilized LC droplets of bare droplets dispersed in water. In the bipolar configuration, the director of the LC is aligned tangentially to the droplet interface and two opposite point defects form, as shown in the cartoon in FIG. 6A. These bipolar droplets have the optical appearance shown in FIG. 6B when viewed by polarized light microscopy.

Figure 6C:
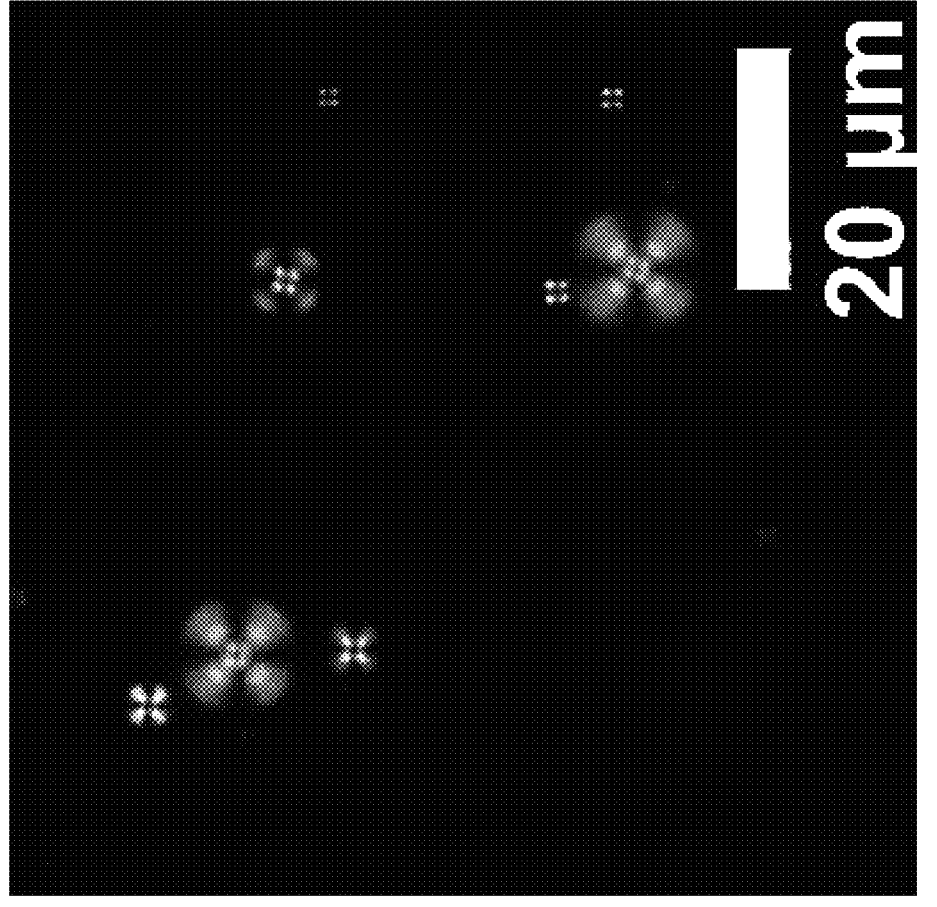
FIG. 6C is a polarized-light micrograph of $SiO_2/C_{16}$TAB-stabilized LC droplets dispersed in water in the radial configuration after addition of 1.0 mM SDS.

These bipolar $SiO_2/C_nTAB$-stabilized droplets underwent rapid and diagnostic "bipolar-to-radial" transformations upon addition of 1.0 mM of SDS. In the 'radial' configuration, the director of the LC was aligned perpendicular to the droplet surface and a single defect formed at the center of the droplet (see FIG. 6A). These radial droplets had the distinct optical appearance shown in FIG. 6C when observed under a polarized light microscope. These results demonstrate that the adsorption of $SiO_2/C_nTAB$ complexes at the aqueous/LC droplet interface does not interfere with other commonly observed amphiphile-induced ordering transitions of the LC.

Experiments were next performed to characterize the influence of SDS concentration on ordering transitions in $SiO_2/C_nTAB$-stabilized LC droplets. As part of these studies, the lowest bulk surfactant concentration was determined at which the addition of SDS could trigger useful changes in anchoring in larger populations of droplets and, thus, produce a diagnostic optical response in this experimental system.

First, it was determined whether varying the length of the tail of the $C_nTAB$ surfactant used to help stabilize the LC droplets could influence the sensitivity of the LC response to SDS. For these experiments, ordering transitions in $SiO_2$/$C_nTAB$-stabilized LC emulsions were characterized upon exposure to SDS using LC emulsions that were either freshly prepared or aged for up to 90 days before use.

Optical micrographs were obtained for LC droplets one day after preparation upon exposure to increasing concentrations of SDS up to 1 mM (additional results of experiments performed using 90-day droplets were similar to the results obtained using these 1-day droplets). Inspection of optical micrographs reveals exposure to SDS to lead to changes in the optical appearances of $SiO_2$/$C_nTAB$-laden LC droplets in all samples (n=8, 12, and 16).

These results also reveal significant differences in the concentrations of SDS at which these transformations are observed to occur. Overall, the results show that increasing the tail length of the $C_nTAB$ used to form the stabilizing complex from n=8 to n=16 leads to a more sensitive response of the LC. It was found that for LC droplets stabilized using complexes formed using $C_{16}TAB$, a concentration of SDS of 0.2 mM was sufficient to induce a bipolar-to-radial ordering transition in ~100% of the droplets. This threshold concentration increased to 0.5 mM for shorter-tailed $C_{12}TAB$-stabilized complexes, and for $C_8TAB$-stabilized complexes, complete and uniform bipolar-to-radial transitions were not observed even at 1 mM SDS (under these conditions, mixtures of radial droplets and other droplet configurations, as well as some bipolar droplets, were observed).

exposed to amphiphiles, the type of configuration that is subsequently observed is often dependent upon the concentration of the amphiphile. In general, escaped radial and pre-radial configurations are observed at lower amphiphile concentrations, and radial configurations are most often observed at or near concentrations that lead to amounts of adsorbed amphiphile approaching droplet surface saturation.

In these studies, it was observed that further lowering the concentration of SDS, at each $SiO_2$/$C_nTAB$ condition, often led to populations of droplets that contained mixtures of one or more of these droplet configurations. In Table 2, designations of B, R, and M were used to represent observations of completely bipolar (B), completely radial (R), or mixtures (M) of these configurations, respectively. For clarity, "M" is used here to indicate populations of droplets that were neither 100% bipolar nor 100% radial, but that instead contained droplets in at least two or more of the bipolar, pre-radial, escaped radial, and radial configurations. An operational criterion was also adopted for categorizing the apparent sensitivity of LC response based on the lowest concentration of amphiphile for which more than 70% of the droplets observed in a sample exhibited ordering transitions that were 'not bipolar' (that is, a condition containing a mixture of configurations in which >70% of droplets were no longer observed to be in their initial bipolar state is considered here to have undergone a meaningful and diagnostic "bipolar-to-non-bipolar" transition that can be used to define a threshold useful for describing and comparing overall droplet sensitivities)

TABLE 2

Ordering transitions of $SiO_2$/CnTAB-stabilized LC droplets triggered by increasing concentrations of the anionic surfactant SDS at different LC storage times. The designations B, R and M represent bipolar, radial or a mixture of configurations, respectively. M denotes a mixed condition for which more than 70% of the droplets observed in a sample exhibited ordering transitions that were not bipolar.

SDS Concentration (mM)

| Day | $SiO_2$/$C_8TAB$ | | | | | $SiO_2$/$C_{12}TAB$ | | | | | | $SiO_2$/$C_{16}TAB$ | | | | | | | | | | |
|---|---|---|---|---|---|---|---|---|---|---|---|---|---|---|---|---|---|---|---|---|---|---|
| | 0 | 0.1 | 0.2 | 0.5 | 1 | 0 | 0.05 | 0.1 | 0.2 | 0.5 | 1 | 0 | 0.001 | 0.002 | 0.005 | 0.01 | 0.02 | 0.05 | 0.1 | 0.2 | 0.5 | 1 |
| 0 | B | B | M | M | M | B | B | M | M | M | M | B | B | B | M | M | M | M | M | R | R | R |
| 1 | B | B | B | M | M | B | B | M | M | M | M | B | B | B | M | M | M | M | M | R | R | R |
| 2 | B | B | B | M | M | B | — | M | M | M | M | B | — | — | — | M | M | M | M | R | R | R |
| 3 | B | B | B | M | M | B | — | M | M | R | R | B | — | — | — | M | M | M | M | R | R | R |
| 4 | B | B | B | M | M | B | — | M | M | R | R | B | — | — | — | M | M | M | M | R | R | R |
| 10 | B | B | B | M | M | B | — | M | M | R | R | B | B | B | M | M | M | M | M | R | R | R |
| 20 | B | B | B | M | M | B | — | M | M | R | R | B | B | B | M | M | M | M | M | R | R | R |
| 30 | B | B | B | M | M | B | — | M | M | R | R | B | B | B | M | M | M | M | M | R | R | R |
| 90 | B | B | B | M | M | B | B | M | M | R | R | B | B | B | M | M | M | M | M | R | R | R |

The results described above were representative results selected, for clarity of discussion, from experiments performed over a wider range of (i) SDS concentrations and (ii) droplet aging periods (from 1 to 90 days after emulsion preparation). The results of these additional experiments are summarized in Table 2, and reveal differences in both the SDS concentrations at which ordering transitions in LC were observed to occur and the range of different optical textures observed in these droplets under each condition.

In addition to the radial configuration described above, spherical LC droplets suspended in water can exhibit other optical configurations, including so-called 'escaped radial' and 'pre-radial' configurations. When LC droplets are For droplets stabilized using complexes formed with $C_8TAB$, the threshold for "bipolar-to-non-bipolar" ordering transitions upon exposure to SDS was determined to be 0.3 mM. For droplets stabilized using complexes formed using longer-tailed $C_{12}TAB$, this threshold was achieved at a lower concentration of 0.1 mM SDS. Finally, for emulsions stabilized with complexes formed using $C_{16}TAB$, >70% of droplets were observed to undergo "bipolar-to-non-bipolar" ordering transitions at substantially lower concentrations of SDS as low as 5 µm. Overall, these results show that $SiO_2$/$C_nTAB$-stabilized LC droplets can detect and report the presence of SDS after up to 90 days of storage time, and that the operational sensitivity of these droplets is influenced significantly by the length of the tails of the surfactant used to help colloidally stabilize them.

It is noted that the threshold concentration that can be used to reliably report the presence of SDS using $SiO_2$/$C_{16}TAB$ (5 µM, or 0.005 mM) is substantially lower than those of bare LC droplets under otherwise identical conditions (0.3 mM SDS). It is noted further that samples of droplets stabilized by $SiO_2$/$C_{16}TAB$ undergo diagnostic transitions at a concentration of SDS (5 µM) that is lower than that required using droplets stabilized with $C_8TAB$ and $C_{12}TAB$. The reasons for this large difference in behavior are not completely clear, but this is likely a consequence of interactions between both the head and tail groups of these cationic surfactants and SDS and/or the LC interfaces in these materials.

Without wishing to be bound to a particular theory, it is thought that the cationic nature of these $C_nTAB$ surfactants promotes interactions with anionic SDS that enhance the recruitment of SDS to the LC interface, thus contributing to improved overall sensitivity. The formation of $C_nTAB$/SDS ion pairs may also increase the areal density of surfactant tails in contact with the LC, thereby leading to ordering transitions that occur at lower SDS concentrations. While these interactions would be expected to occur for mixtures of SDS and $C_nTAB$ regardless of tail length, the increased length of the hydrocarbon tails in $C_{16}TAB$ may promote changes in the orientation of the LC at these aqueous/LC interfaces more effectively than those of $C_8TAB$ and $C_{12}TAB$.

Experiments were also performed using LC droplets stabilized by $SiO_2$ nanoparticles without added $C_nTAB$ surfactant. Under these conditions, 0.5 mM SDS was required to trigger changes in LC droplet configuration (see Table 3), a concentration that is substantially higher than the concentration required to trigger these changes in bare LC droplets (0.3 mM).

It is concluded that, although $SiO_2$ nanoparticles alone can effectively stabilize LC emulsions and do not abrogate their functional behaviors in the context of sensing, they do reduce sensitivity. These results provide further support for the view that the cationic $C_nTAB$ surfactants play important roles in governing the response of our LC droplets. Other contributions or combinations of electrostatic and hydrophobic interactions are also possible and likely in these complex and dynamic systems. However, the physical pictures proposed here are generally consistent with the results above and the results of additional experiments performed using anionic and non-ionic surfactants, described in greater detail below.

TABLE 3

Ordering transitions of $SiO_2$/-stabilized LC droplets triggered by addition of increasing concentrations of the anionic surfactant SDS at different concentrations and emulsion storage times. The letters B, R and M represent bipolar, radial or a mixture of configurations, respectively.

| Day | 0 | 0.05 | 0.1 | 0.2 | 0.5 |
|---|---|---|---|---|---|
| | | | SDS (mM) | | |
| 0 | B | B | B | B | M |
| 1 | B | B | B | B | M |
| 2 | — | — | — | — | — |
| 3 | — | — | — | — | — |
| 4 | — | — | — | — | — |
| 10 | B | B | B | B | M |
| 20 | B | B | B | B | M |
| 30 | B | B | B | B | M |
| 90 | B | B | B | B | M |

Ordering Transitions Induced by Other Synthetic and Bacterial Surfactants

Additional experiments were performed with $SiO_2$/$C_{16}TAB$-stabilized LC droplets using $C_{12}TAB$ and $C_{12}E4$ as additional cationic and neutral analytes. SDS, $C_{12}TAB$, and $C_{12}E4$ differ in the structure and charge of their polar head groups (FIG. 2), but each has hydrocarbon tails that are 12 carbons long. This set of model surfactants can thus be used to provide insight into the influence of charge on the responses of LC droplets.

The nature of the surfactant head group does not directly impact LC anchoring transitions significantly, but can influence the interfacial density of the adsorbed surfactant through head group repulsion. In view of the results described above, it was hypothesized that the presence of cationic surfactants in our $SiO_2$/$C_nTAB$-stabilized LC droplet could influence the sensitivity of the LC response to anionic, cationic, and non-ionic surfactants and, thereby, potentially provide a basis for introducing some degree of selectivity to these systems.

Representative polarized light micrographs of LC droplets exposed to varying concentrations of $C_{12}TAB$ and $C_{12}E4$ were obtained, similar to those shown obtained above for exposure to SDS. The results are summarized in Table 4, Table 5, and in FIGS. 7A-7C, which show comparisons of the threshold concentrations of SDS, $C_{12}TAB$, and $C_{12}E4$ determined to be required to induce ordering transitions in LC droplets at each $SiO_2$/$C_{16}TAB$ condition.

TABLE 4

Ordering transitions of $SiO_2$ or $SiO_2$/CnTAB-stabilized LC droplets triggered by addition of increasing concentrations of cationic surfactant $C_{12}TAB$ at different storage times. The letters B, R and M represent bipolar, radial or a mixture of configurations, respectively.

| | | $SiO_2$ | | | | $SiO_2$/$C_8TAB$ | | | | | $SiO_2$/$C_{12}TAB$ | | | | | | $SiO_2$/$C_{16}TAB$ | | | | |
|---|---|---|---|---|---|---|---|---|---|---|---|---|---|---|---|---|---|---|---|---|---|
| Day | 0 | 1.5 | 2 | 3 | 0 | 1 | 1.5 | 2 | 3 | 0 | 1 | 1.3 | 1.5 | 2 | 3 | 0 | 1 | 1.3 | 1.5 | 2 | 3 |
| 0 | B | B | M | M | B | B | B | M | R | B | B | B | M | M | R | B | B | M | M | M | R |
| 1 | B | B | M | M | B | B | B | M | R | B | B | B | M | M | R | B | B | M | M | M | R |

TABLE 5

Ordering transitions of SiO$_2$ or SiO$_2$/C$_n$TAB-stabilized LC droplets triggered by addition of increasing
concentrations of cationic surfactant C$_{12}$E$_4$ at different storage times. The letters B, R and M represent
bipolar, radial or a mixture of configurations, respectively C$_{12}$E$_4$ (mM)

| | SiO$_2$ | | | | SiO$_2$/C$_8$TAB | | | | | | SiO$_2$/C$_{12}$TAB | | | | | | SiO$_2$/C$_{16}$TAB | | | | | |
|---|---|---|---|---|---|---|---|---|---|---|---|---|---|---|---|---|---|---|---|---|---|---|
| Day | 0 | 0.03 | 0.05 | 0.1 | 0 | 0.01 | 0.02 | 0.03 | 0.05 | 0.1 | 0 | 0.01 | 0.02 | 0.03 | 0.05 | 0.1 | 0 | 0.01 | 0.02 | 0.03 | 0.05 | 0.1 |
| 0 | B | B | B | M | B | B | B | B | M | M | B | B | B | M | M | M | B | B | M | M | M | M |
| 1 | B | B | B | M | B | B | B | B | M | M | B | B | B | M | M | M | B | B | M | M | M | M |
| 8 | B | B | B | M | B | B | B | B | M | M | B | B | B | M | M | M | B | B | M | M | M | M |

Figure 7A:
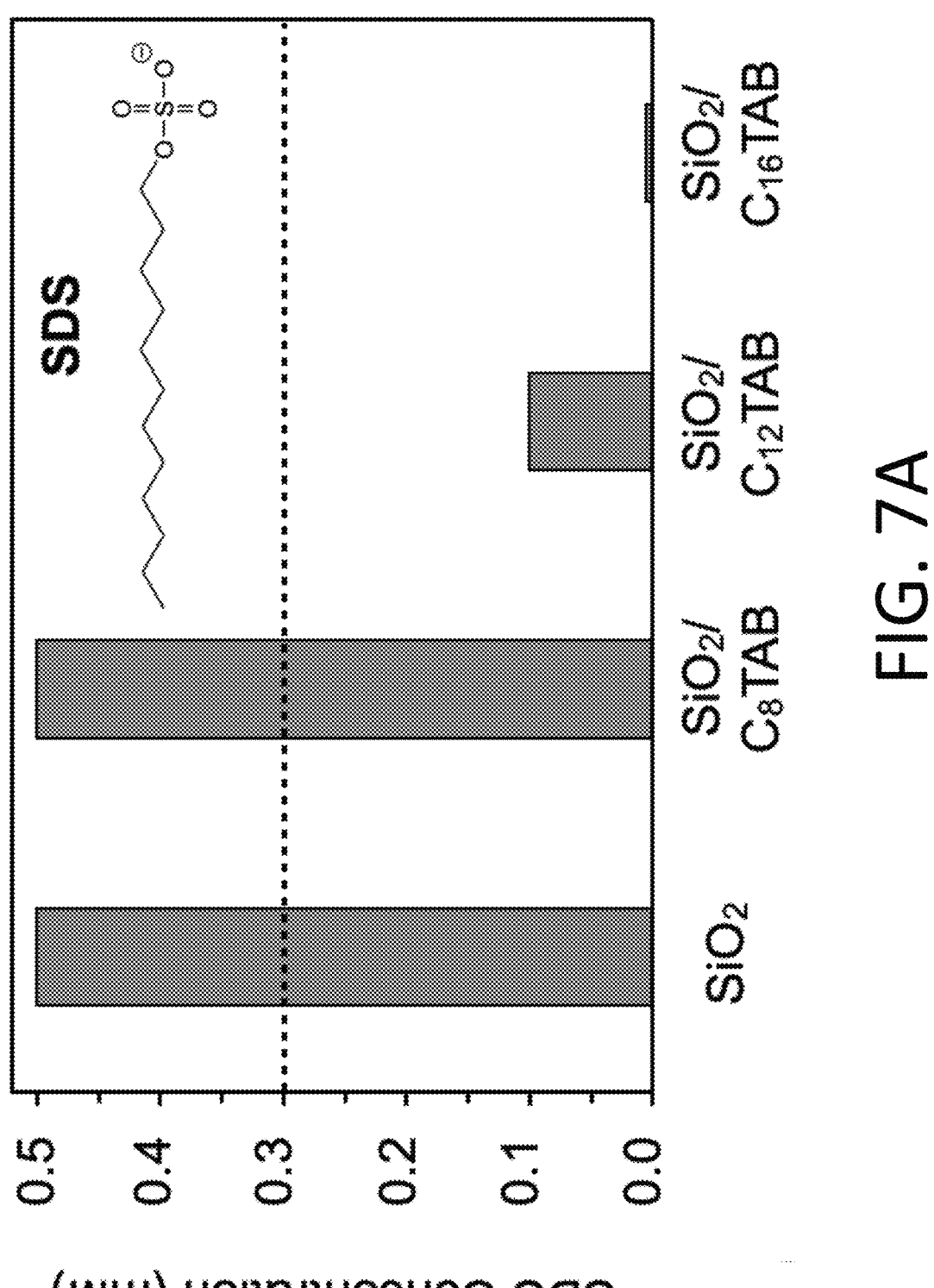
FIG. 7A is a plot showing a comparison of the surfactant concentration required to trigger an ordering transition in LC droplets for the investigated Pickering LC emulsions for anionic SDS. The dotted line represents the surfactant concentration needed to trigger an LC ordering transition in bare droplets. The surfactant structure is also shown.
Figure 7B:
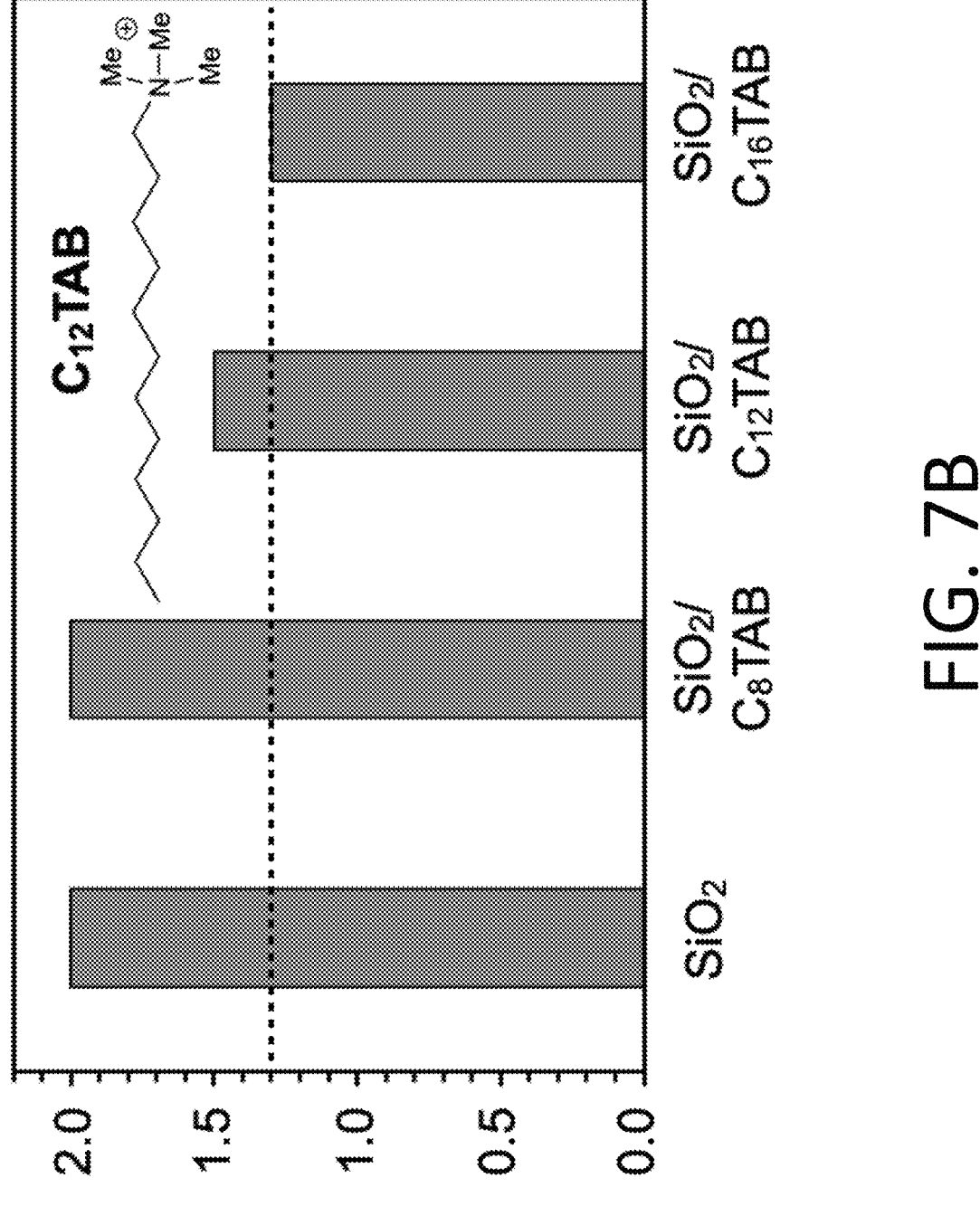
FIG. 7B is a plot showing a comparison of the surfactant concentration required to trigger an ordering transition in LC droplets for the investigated Pickering LC emulsions for cationic $C_{12}$TAB. The dotted line represents the surfactant concentration needed to trigger an LC ordering transition in bare droplets. The surfactant structure is also shown.
Figure 7C:
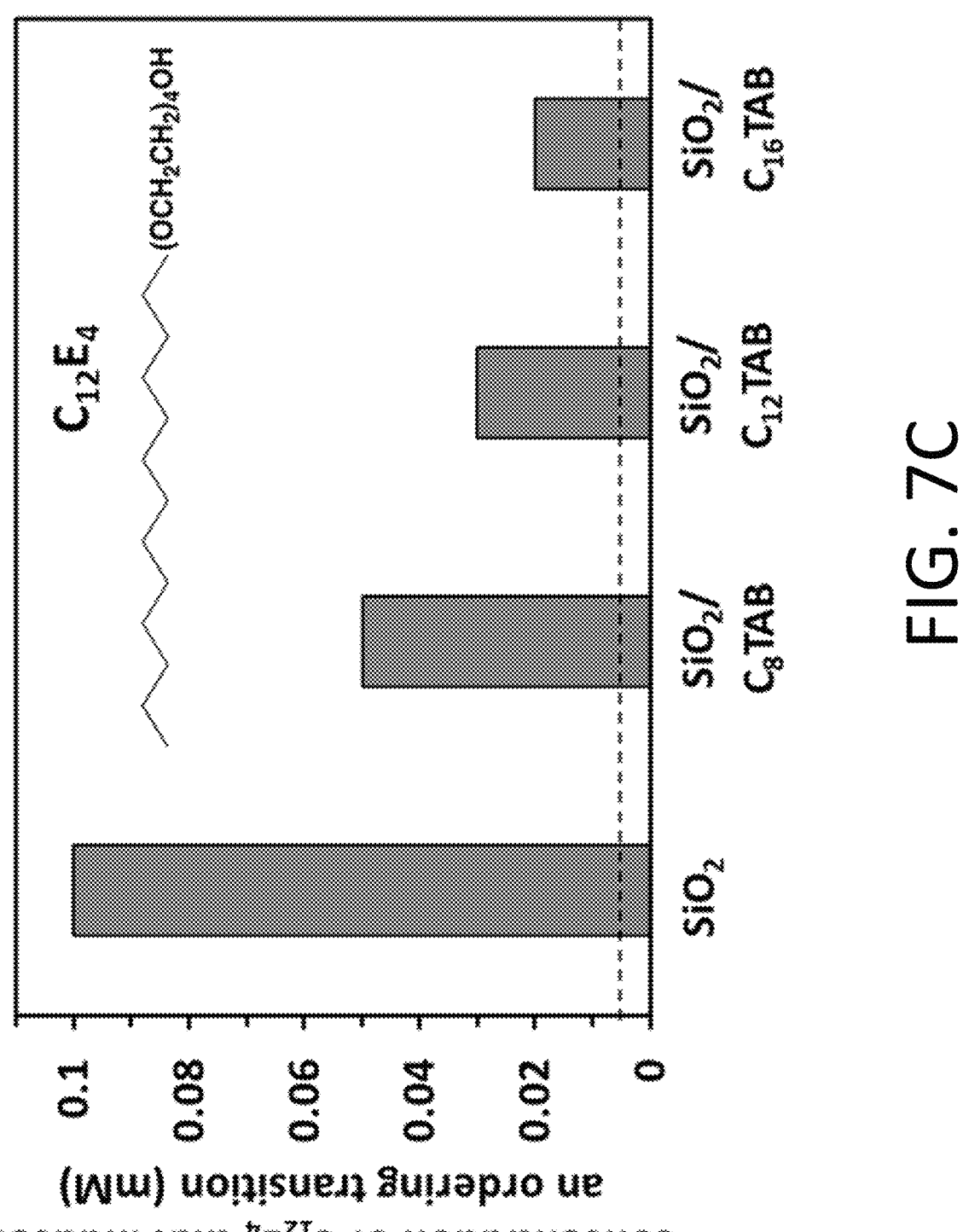
FIG. 7C is a plot showing a comparison of the surfactant concentration required to trigger an ordering transition in LC droplets for the investigated Pickering LC emulsions for nonionic $C_{12}E_4$. The dotted line represents the surfactant concentration needed to trigger an LC ordering transition in bare droplets. The surfactant structure is also shown.

Inspection of the results presented in FIGS. 7A-7C reveals that, for the detection and reporting of added C$_{12}$TAB (FIG. 7B), the LC response is dependent upon the hydrocarbon tail length of the C$_n$TAB surfactant used to form the stabilizing complexes, as observed for experiments using SDS (FIG. 7A). The surfactant concentration required to trigger an LC ordering transition decreased monotonically with increasing tail length over the range of 2.0 mM to 1.3 mM. This range of concentrations is smaller than that observed for the response to SDS, but it is equal to or higher than the concentration of C$_{12}$TAB otherwise required to promote transitions in bare LC droplets (1.3 mM; as indicated by the dotted line in FIG. 7B; see also Table 4).

This result is interpreted to reflect the presence of additional cationic surfactant already situated at the interfaces of these SiO$_2$/C$_n$TAB-stabilized LC droplets, which would introduce repulsive ionic interactions that could influence or hinder the transport of additional C$_{12}$TAB to the aqueous/LC interface (i.e., the opposite of what was observed and discussed above, and summarized in FIG. 7A, for results in which anionic SDS was used as an analyte). The results of experiments using LC droplets stabilized by SiO$_2$ nanoparticles only (no C$_n$TAB) revealed threshold concentrations for response that were higher than those observed in the presence of SiO$_2$/C$_n$TAB complexes, possibly due to the preferential or partial adsorption of C$_{12}$TAB to the surfaces of the bare nanoparticles, which would deplete the overall effective concentration of added C$_{12}$TAB available to adsorb at the aqueous/LC interface.

FIG. 7C shows the equivalent set of results for experiments in which the nonionic surfactant C$_{12}$E$_4$ was used as a model analyte. These results reveal a similar increase in the sensitivity of the LC droplet response as the length of the tail of the C$_n$TAB surfactant used to form the stabilizing nanoparticle/surfactant complexes was increased, as observed for both SDS and C$_{12}$TAB.

The range of surfactant concentrations required to trigger these responses (from 0.05 mM to 0.02 mM) was also higher than that required to trigger an ordering transition in bare LC droplets (0.02 mM; as indicated by the dotted line in FIG. 7C; see also Table 5), a result that is, overall, consistent with the behavior observed in experiments using CTAB as a model analyte, as discussed above. This range also occurs below the threshold concentration for a triggered response in LC droplets stabilized using bare SiO$_2$ nanoparticles.

Overall, the results above show that the analyte concentration required to induce an ordering transition in SiO$_2$/C$_n$TAB-stabilized LC droplets decreases monotonically with increasing C$_n$TAB tail length for all surfactants tested, revealing a straightforward approach that can be used to tune the sensitivities of these LC droplets. These results also show that, while SiO$_2$ nanoparticles alone can confer colloidal stability to LC droplets without preventing their ability to respond to aqueous amphiphiles, the response of the LC is generally enhanced when SiO$_2$/C$_n$TAB complexes are used. Notably, the results also show that LC emulsions stabilized using SiO$_2$/C$_{16}$TAB complexes respond to SDS at concentrations that are much lower (in the micromolar range) as compared to the concentrations required when cationic or nonionic analytes are used (in the millimolar range).

These results are, in general, consistent with the view that the SiO$_2$/C$_{16}$TAB complexes hosted at these LC droplet interfaces can preferentially recruit anionic amphiphiles. This result demonstrates strategies that may be used for the design of LC droplets that can exhibit additional degrees of selectivity based on amphiphile structure or charge.

Based on the results above using model synthetic surfactants, a final series of experiments was performed to explore the potential of these LC Pickering emulsions to detect the biosurfactant rhamnolipid in aqueous solutions. Rhamnolipid is an amphiphilic virulence factor produced by the bacterial pathogen *Pseudomonas aeruginosa* under the control of quorum sensing.

Figure 8:
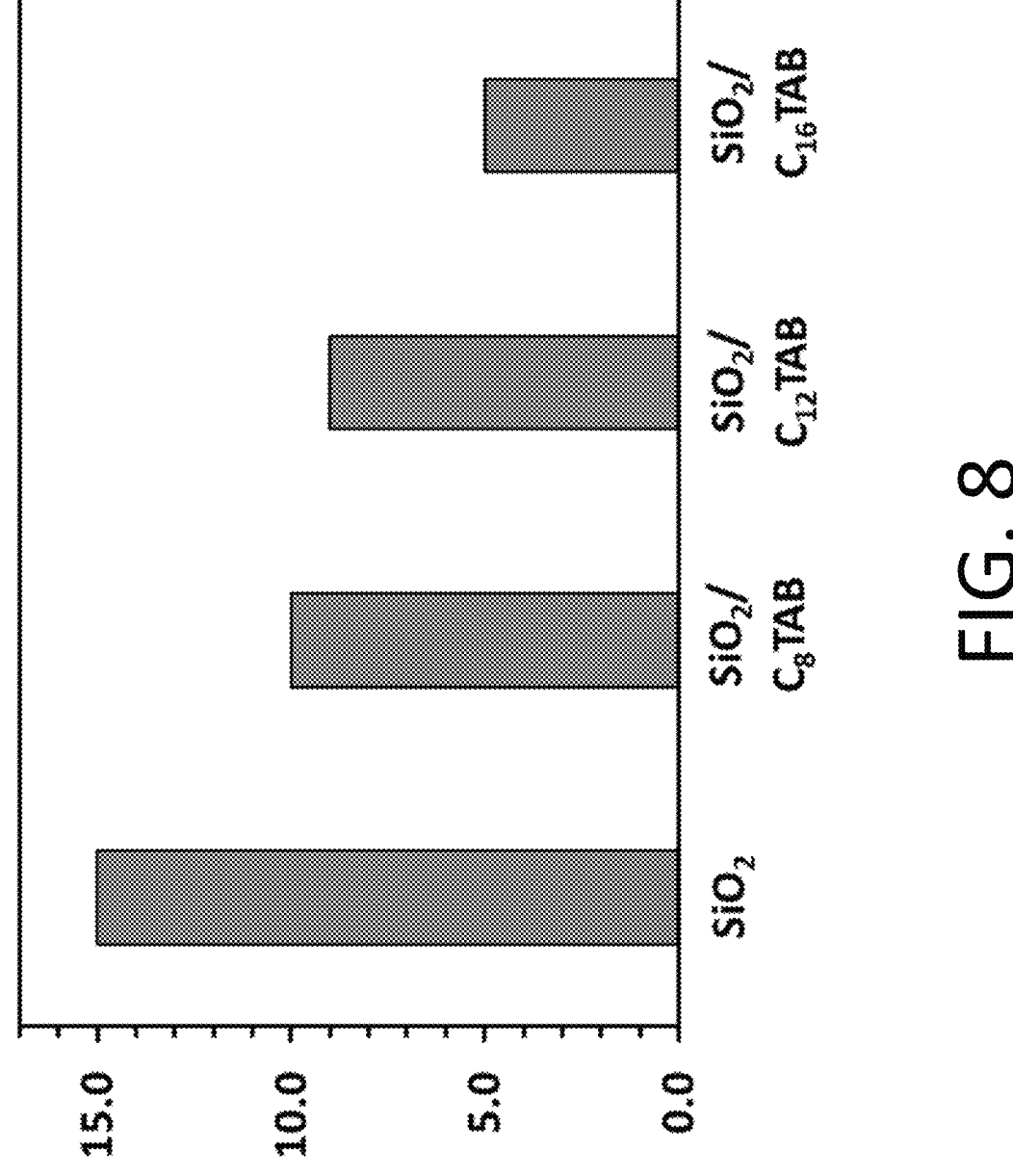
FIG. 8 is a plot showing a comparison of the rhamnolipid concentration required to trigger an ordering transition in LC droplets for the Pickering LC emulsions using $SiO_2/C_n$TAB complexes.

FIG. 8 shows a plot comparing the threshold concentrations of rhamnolipid required to induce ordering transitions in LC droplets for Pickering emulsions formed using SiO$_2$/C$_8$TAB, SiO$_2$/C$_{12}$TAB, and SiO$_2$/C$_{16}$TAB formulations (see also Table 6). The results demonstrate that LC droplets stabilized by SiO$_2$/C$_{16}$TAB can respond to and report the presence of rhamnolipid at concentrations of 5 µg mL$^{-1}$. These formulations thus provide a platform for the sensing and reporting of bacterial virulence products in aqueous solutions with sensitivities that are similar to those reported for bare droplets, but with levels of colloidal stability that far exceed those of unprotected, bare droplet systems.

TABLE 6

Ordering transitions of SiO$_2$ or SiO$_2$/C$_n$TAB-stabilized LC droplets triggered by addition of increasing concentrations of Rhamnolipids after 16 days of storage time. The letters B, R and M represent bipolar, radial or a mixture of configurations, respectively.

| | | | | | | | | | | | Rhamnolipid (μg/mL) | | | | | | | | | | | | | | | | |
|---|---|---|---|---|---|---|---|---|---|---|---|---|---|---|---|---|---|---|---|---|---|---|---|---|---|---|
| | SiO$_2$ | | | | SiO$_2$/C$_8$TAB | | | | | | | SiO$_2$/C$_{12}$TAB | | | | | | | | SiO$_2$/C$_{16}$TAB | | | | | | | |
| Day | 0 | 10 | 15 | 25 | 0 | 6 | 8 | 9 | 10 | 15 | 25 | 0 | 4 | 6 | 8 | 9 | 10 | 15 | 25 | 0 | 2 | 4 | 5 | 6 | 10 | 15 | 25 |
| 16 | B | B | M | M | B | B | B | B | M | M | M | B | B | B | B | M | M | M | M | B | B | B | M | M | M | M | R |

Conclusion

LC emulsions can detect and report the presence of amphiphilic analytes in aqueous environments with remarkable sensitivity, but the practical utility of these droplet-based sensors is limited by the fact that they are not colloidally stable. Herein has been reported a Pickering stabilization strategy based on the use of nanoparticle-surfactant complexes, which can provide remarkable colloidal stability to LC droplets for at least three months. These nanoparticle-surfactant complexes are comprised of SiO$_2$ nanoparticles and three different C$_n$TAB surfactants of different alkyl tail lengths (n=8, 12, or 16). The results reveal that these nanoparticle-surfactant complexes adsorb to LC-water interface and lead to similar levels of colloidal stability, demonstrating that they are effective LC emulsion stabilizers.

It was also demonstrated that these SiO$_2$/C$_n$TAB-stabilized LC droplets undergo diagnostic bipolar-to-radial ordering transitions upon exposure to anionic, cationic, and nonionic amphiphilic analytes. The analyte concentrations required to induce ordering transitions in these stabilized LC droplets decreases monotonically with increases in the hydrocarbon tail length of the C$_n$TAB surfactant used to form the SiO$_2$/C$_n$TAB stabilizing complex. In general, increasing the C$_n$TAB tail length from n=8 to n=16 leads to a more sensitive response of the LC to the model analytes SDS, C$_{12}$TAB, and C$_{12}$E$_4$, demonstrating that this approach is general and can be used to tune the sensitivities of the stabilized LC droplets more broadly.

The results also reveal significant differences in the concentrations of the anionic surfactant SDS required to trigger LC ordering transitions (in the micromolar range) when compared to the cationic C$_{12}$TAB, and the nonionic C$_{12}$E$_4$ (in the millimolar range), demonstrating that this strategy may be used to impart some degree of selectivity to the stabilized LC droplets. Moreover, the threshold concentration of SDS reported by the SiO$_2$/C$_{16}$TAB complex (5 μM) is two orders of magnitude lower than that required to trigger diagnostic orientational transitions in bare LC droplets, demonstrating the potential to substantially enhance the sensitivity of LC droplets using this approach.

Finally, it was demonstrated that these stabilized LC droplets can be used to report the presence of rhamnolipid, a biosurfactant produced as a virulence factor by the bacterial pathogen *Pseudomonas aeruginosa*, at biologically relevant concentrations.

When combined, the results reported here support the conclusion that Pickering LC emulsions stabilized by SiO$_2$/C$_n$TAB complexes provide a useful approach for the design of responsive LC droplet-based sensors with substantially improved colloidal and shelf-life stability, as well as new opportunities for tuning and enhancing sensitivity of response. It is anticipated that the exceptional colloidal stability and extended shelf-life of these Pickering emulsion formulations may be used as the basis of LC droplet sensors as useful and practical tools in a range of different fundamental and applied settings.

Additional experimental data and figures may be found in U.S. provisional patent application No. 63/241,198 that was filed Sep. 7, 2021, the entire contents of which are incorporated herein by reference.

Those skilled in the art will recognize, or be able to ascertain using no more than routine experimentation, numerous equivalents to the specific materials and methods described herein. Such equivalents are considered to be within the scope of this invention and encompassed by the following claims.

What is claimed is:

1. A liquid crystal-based system for detecting and/or quantifying an analyte, the system comprising a plurality of dispersed liquid crystal microdomains, each liquid crystal microdomain comprising a liquid crystal, each liquid crystal microdomain confined by an interface formed with a surrounding medium, having a detectable orientation, and having a minor axis of between 0.5 μm and 200 μm;

wherein a plurality of nanoparticle-amphiphile complexes are adsorbed at the interface, wherein the nanoparticles of the plurality of nanoparticle-amphiphile complexes comprise silica, the amphiphiles of the plurality of nanoparticle-amphiphile complexes comprise a quaternary ammonium surfactant, and the nanoparticles and the amphiphiles of the plurality of nanoparticles-amphiphile complexes are associated with each other via non-covalent interactions.

2. The liquid crystal-based system of claim 1, wherein the quaternary ammonium surfactant is an alkyl trimethylammonium halide.

3. The liquid crystal-based system of claim 2, wherein the alkyl group of the alkyl trimethylammonium halide has at least 16 carbon atoms.

4. The liquid crystal-based system of claim 3, wherein the alkyl trimethylammonium halide is hexadecyltrimethylammonium bromide.

5. The liquid crystal-based system of claim 4, wherein the liquid crystal of each liquid crystal microdomain comprises a nematic liquid crystal.

6. The liquid crystal-based system of claim 5, wherein the nematic liquid crystal comprises 4'-pentyl-4-cyanobiphenyl.

7. The liquid crystal-based system of claim 6, wherein the surrounding medium comprises an aqueous buffer solution.

8. The liquid crystal-based system of claim 7, wherein the quaternary ammonium surfactant is present at an amount of from 0.001 mM to 0.1 mM.

9. The liquid crystal-based system of claim 1, wherein the surrounding medium comprises water.

10. The liquid crystal-based system of claim 9, wherein the surrounding medium comprises an aqueous buffer solution.

11. The liquid crystal-based system of claim 9, wherein each liquid crystal microdomain is a liquid crystal droplet having a diameter of between 1 μm and 10 μm.

12. The liquid crystal-based system of claim 1, wherein the liquid crystal of each liquid crystal microdomain comprises a nematic liquid crystal.

13. The liquid crystal-based system of claim 1, wherein the liquid crystal of each liquid crystal microdomain comprises 4'-pentyl-4-cyanobiphenyl.

14. The liquid crystal-based system of claim 1, further comprising a test sample comprising an analyte, the test sample in fluid communication with the plurality of dispersed liquid crystal microdomains.

15. The liquid crystal-based system of claim 14, wherein the analyte is a different chemical entity than the amphiphiles.

16. The liquid crystal-based system of claim 15, wherein the amphiphiles and the analyte have opposite charges.

17. The liquid crystal-based system of claim 15, wherein the plurality of nanoparticle-amphiphile complexes is capable of detecting the analyte at a concentration of no more than 6 μM in the test sample.

18. The liquid crystal-based system of claim 1, wherein the surrounding medium comprises an aqueous buffer solution; and wherein the liquid crystal of each liquid crystal microdomain comprises a nematic liquid crystal.

19. A method comprising:
(a) contacting a test sample comprising an analyte with the liquid crystal-based system of claim 1; and
(b) determining an orientation of the liquid crystal within each of the plurality of dispersed liquid crystal microdomains.

* * * * *